US009296506B2

(12) United States Patent
Cundy

(10) Patent No.: US 9,296,506 B2
(45) Date of Patent: Mar. 29, 2016

(54) BAG-SUPPORTING FRAME APPARATUS WHICH IS MOUNTABLE ON A SUBSTRATE, AND METHOD OF USING SAME

(71) Applicant: John Patrick Cundy, Macomb, MI (US)

(72) Inventor: John Patrick Cundy, Macomb, MI (US)

( * ) Notice: Subject to any disclaimer, the term of this patent is extended or adjusted under 35 U.S.C. 154(b) by 0 days.

(21) Appl. No.: 14/245,619

(22) Filed: Apr. 4, 2014

(65) Prior Publication Data

US 2014/0284434 A1 Sep. 25, 2014

Related U.S. Application Data

(63) Continuation-in-part of application No. 13/558,851, filed on Jul. 26, 2012.

(60) Provisional application No. 61/574,160, filed on Jul. 28, 2011, provisional application No. 61/574,982, filed on Aug. 13, 2011, provisional application No. 61/629,300, filed on Nov. 16, 2011.

(51) Int. Cl.
| | |
|---|---|
| *B65B 67/12* | (2006.01) |
| *B65F 1/14* | (2006.01) |
| *F16B 45/00* | (2006.01) |
| *A47G 7/04* | (2006.01) |
| *F16M 13/02* | (2006.01) |

(52) U.S. Cl.
CPC ............. *B65B 67/12* (2013.01); *B65B 67/1227* (2013.01); *B65F 1/1415* (2013.01); *A47G 7/045* (2013.01); *B65B 2210/18* (2013.01); *F16B 45/00* (2013.01); *F16M 13/02* (2013.01)

(58) Field of Classification Search
CPC .......... A47H 1/16; F16B 45/00; A47G 25/08; A47G 7/045; A47G 27/00; F16M 13/02; B65B 7/12; B65B 1/1415; B65B 67/1238; B65B 67/1227; B65B 2210/18
USPC ............................... 248/30–304, 218.4, 309.1
See application file for complete search history.

(56) References Cited

U.S. PATENT DOCUMENTS

| | | | |
|---|---|---|---|
| 313,515 A | | 3/1885 | Parker |
| 323,141 A | * | 7/1885 | Hatz ............................... 248/99 |
| 432,966 A | | 7/1890 | Allen |
| 490,578 A | | 1/1893 | Merry |
| 666,296 A | | 1/1901 | Wiard |
| 669,660 A | | 3/1901 | Pierce |
| 678,684 A | | 7/1901 | Powell |
| 725,538 A | | 4/1903 | Brown |
| 812,307 A | | 2/1906 | Stearns |

(Continued)

*Primary Examiner* — Nkeisha Smith
(74) *Attorney, Agent, or Firm* — Carrier Blackman & Associates, P.C.; William D. Blackman; Joseph P. Carrier

(57) ABSTRACT

A bag-supporting frame apparatus is removably mountable on a portion of a substrate. The apparatus includes a gripping portion for contacting the substrate and holding the apparatus in place on the substrate. The apparatus also includes a bag-supporting portion configured to support an open end portion of a flexible plastic bag thereon, the bag-supporting portion including an outer loop portion and a downwardly-extending short portion attached to the outer loop portion at each end thereof. A projecting catch is defined, at each end of the outer loop portion, at the juncture of the downwardly-extending short portion and the outer loop portion. The outer loop portion is sized and configured to support a plastic bag of a predetermined size thereon. The apparatus also includes a connecting portion interconnecting the bag-supporting portion and the gripping portion. Methods of using the apparatus are also described.

1 Claim, 25 Drawing Sheets

(56) References Cited

U.S. PATENT DOCUMENTS

| | | | |
|---|---|---|---|
| 1,012,045 A | 12/1911 | Adams | |
| 1,326,887 A | 12/1919 | Wood | |
| 1,378,607 A | 5/1921 | Norton | |
| 1,392,716 A | 10/1921 | Spraggins | |
| 1,417,215 A | 5/1922 | Syrett | |
| 1,427,123 A * | 8/1922 | Pulig | 248/99 |
| 1,760,752 A * | 5/1930 | Happer | 248/99 |
| 1,773,927 A * | 8/1930 | Mills | 248/99 |
| 2,242,168 A * | 5/1941 | Bergman | 47/47 |
| 2,471,309 A * | 5/1949 | Chandler | 248/99 |
| 2,594,640 A * | 4/1952 | Greuling | 224/512 |
| 2,628,054 A * | 2/1953 | Fazakerley | 248/311.2 |
| 2,678,184 A * | 5/1954 | Erdody | 248/311.2 |
| 2,747,825 A * | 5/1956 | Lachenmayer | 248/210 |
| 2,797,058 A | 6/1957 | Packham | |
| 2,902,167 A * | 9/1959 | Smith | 211/34 |
| 2,912,204 A * | 11/1959 | Raysinger | 248/210 |
| 2,919,813 A | 1/1960 | Clark | |
| 2,926,824 A | 3/1960 | St. Clair | |
| 2,991,031 A * | 7/1961 | Sederquist | 248/99 |
| 3,272,467 A * | 9/1966 | Kassube | 248/211 |
| 3,381,824 A * | 5/1968 | Blumenschein | 211/68 |
| 3,504,108 A * | 3/1970 | Kihs | 174/154 |
| 3,559,939 A * | 2/1971 | Luna | 248/210 |
| 3,926,392 A | 12/1975 | Davidson | |
| 4,503,636 A * | 3/1985 | Stuckey | 47/44 |
| 4,672,703 A * | 6/1987 | Frazier | 5/503.1 |
| 4,759,518 A | 7/1988 | Yardas | |
| 4,915,330 A * | 4/1990 | Buckley | 248/99 |
| 4,943,016 A | 7/1990 | Hennecke | |
| 5,263,672 A | 11/1993 | He | |
| 5,350,142 A * | 9/1994 | Kurtzman et al. | 248/99 |
| 5,855,286 A * | 1/1999 | Zaid | 211/87.01 |
| 6,209,837 B1 * | 4/2001 | Harms | 248/302 |
| 6,446,919 B1 | 9/2002 | Tsui | |
| 6,517,033 B2 * | 2/2003 | Russell et al. | 248/99 |
| 6,971,204 B1 * | 12/2005 | Gibney | 47/39 |
| 7,140,148 B1 | 11/2006 | Williams, II | |
| 7,404,531 B2 | 7/2008 | McConnell | |
| 7,661,635 B2 | 2/2010 | McConnell | |
| 7,677,513 B1 * | 3/2010 | Londo | 248/217.1 |
| 8,540,106 B2 * | 9/2013 | Banus | 220/495.08 |
| 8,561,345 B2 * | 10/2013 | Armas | 47/39 |
| 2004/0232288 A1 | 11/2004 | Kung | |
| 2005/0269469 A1 | 12/2005 | Cummins | |
| 2006/0175488 A1 | 8/2006 | Schmiddem et al. | |
| 2007/0090251 A1 | 4/2007 | Padden | |
| 2007/0252061 A1 * | 11/2007 | Feetham et al. | 248/302 |
| 2013/0014352 A1 * | 1/2013 | Wells | 24/265 H |

* cited by examiner

BAG-SUPPORTING FRAME APPARATUS WHICH IS MOUNTABLE ON A SUBSTRATE, AND METHOD OF USING SAME

CROSS-REFERENCE TO RELATED APPLICATIONS

The present application is a continuation-in-part application of U.S. patent application Ser. No. 13/558,851, filed on 26 Jul. 2012. U.S. patent application Ser. No. 13/558,851 claimed priority under 35 U.S.C. 119(e), based on each of the following:
1. U.S. provisional patent application 61/574,160, filed 28 Jul. 2011;
2. U.S. provisional patent application 61/574,982, filed 13 Aug. 2011, and
3. U.S. provisional patent application 61/629,300, filed 16 Nov. 2011.

The entire disclosure of each of the foregoing priority documents, including specification, claims, and drawings, is incorporated by reference herein.

BACKGROUND OF THE INVENTION

1. Field of the Invention

The present invention relates to a support apparatus for holding a flexible plastic bag thereon, and to a method of using the described apparatus. More particularly, the present invention relates to a bag-supporting apparatus, which is configured to fit on an edge portion of a substrate, and to a method of using the apparatus. The apparatus may be configured to fit on either a horizontally oriented substrate or a vertically oriented substrate.

2. Description of the Background Art

At times, a person may be working or conducting a recreational activity in an area adjacent a table, workbench, counter top, deck rail, vehicle tailgate, vertically oriented fence panel, or other substantially planar work surface, and such person may not have a trash receptacle conveniently nearby. Such work or activity may include refuse-generating activity such as cleaning fish, preparing food, engaging in an art or craft activity, having a picnic with family and/or friends where food is being consumed, or simply cleaning an area. Alternatively, such person may be in an area close to a vertical support member such as a support post of a tent, a portable pop-up canopy or a vertical tree trunk of a young tree or a tree branch approximately one inch in diameter.

A number of different devices are known for mounting on a substrate and for supporting a flexible bag thereon. Examples of some of the known devices include U.S. Pat. Nos. 490,578, 4,759,518, 5,263,672, 6,446,919, 6,517,033, 7,404,531 and 7,661,635.

Although the known devices have some utility for their intended purposes, a need still exists in the art for a portable bag-holding device which may be mounted on an edge of a horizontally-oriented table, counter, or similar substrate.

In particular, there is a need for an improved portable bag-holding device which may be mounted in cantilevered fashion without requiring any tools, which can be easily installed and removed as needed, and which will securely hold a bag thereon, even when the bag has a significant amount of material therein.

SUMMARY OF THE INVENTION

The present invention provides a bag-holding apparatus for use in an area, adjacent a supportive substrate, where a conventional waste receptacle is not available. The apparatus may be configured to fit on either a horizontally oriented substrate or a vertically oriented substrate.

A bag-holding apparatus according to a first illustrative embodiment of the invention includes a gripping portion for contacting a substrate and holding the apparatus in place on the substrate, a bag-supporting portion for supporting a bag thereon, and a connecting portion which is integrally formed with, and which interconnects the bag-supporting portion and the gripping portion. The bag-supporting portion is designed to slightly stretch the mouth of the bag, and is configured to provide a certain amount of designed-in interference with a bag when the bag is placed thereon, in order to cause tension so as to securely hold the bag in place.

In a first embodiment, the gripping portion includes an upper horizontal section, a lower substrate-contacting arm, and a connection section.

The bag-supporting portion includes an outer loop portion and a downwardly-extending short portion attached to the outer loop portion at each end thereof, where a projecting catch is defined between the outer loop portion and the short portion at each end of the outer loop portion, and where the outer loop portion is sized and configured to support a plastic bag of a predetermined size thereon.

The gripping portion may be configured to attach the apparatus to a substrate in cantilevered fashion while contacting the substrate from both above and below.

Accordingly, it is an object of the present invention, in a first embodiment, to provide a method and apparatus for temporarily and removably installing a plastic bag on a support apparatus at an edge portion of a table, countertop, or similar flat substrate when the apparatus is installed on the substrate.

It is another object of the present invention, in another embodiment, to provide a method and apparatus for temporarily and removably installing a plastic bag on a support apparatus which is temporarily and removably attached to a slim, vertically oriented post, tree trunk or tree branch.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Figure 1:
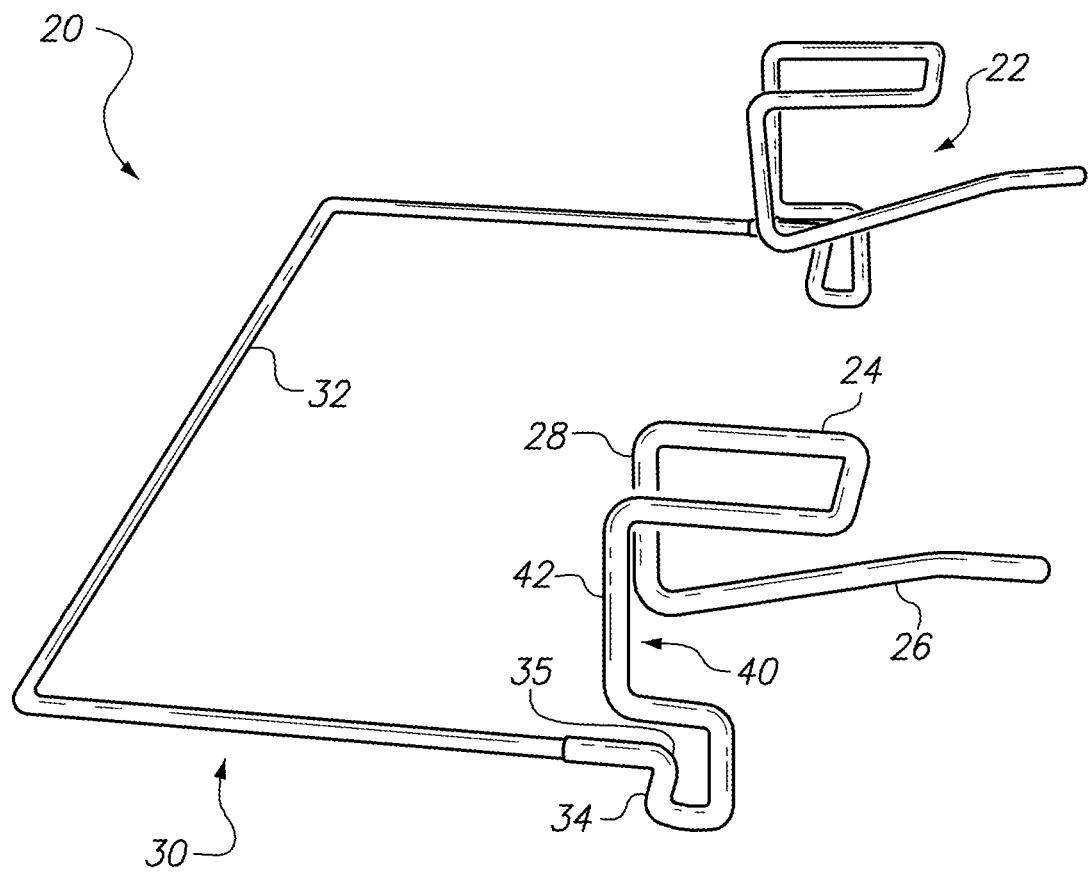
FIG. 1 is a perspective view of a support frame apparatus according to a first embodiment of the invention, shown inverted and unattached to any substrate.
Figure 2:
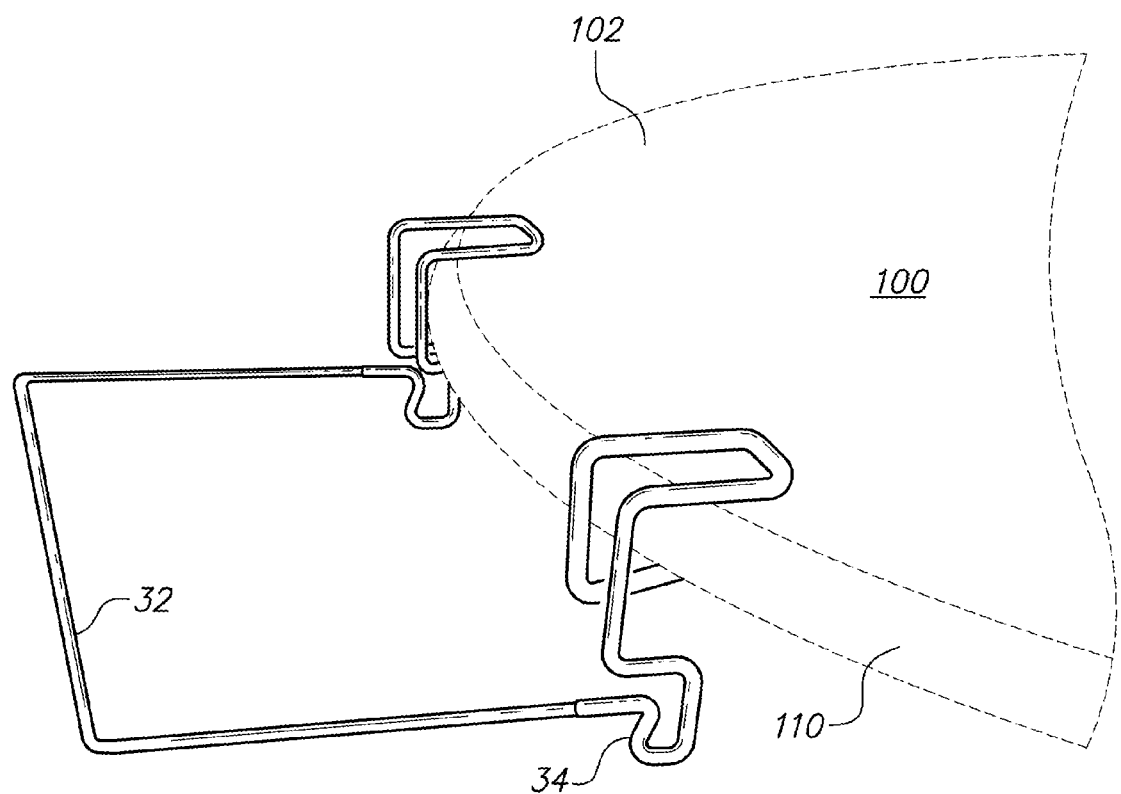
FIG. 2 is a perspective view of the support frame apparatus of FIG. 1 installed on an edge portion of a table.
Figure 3:
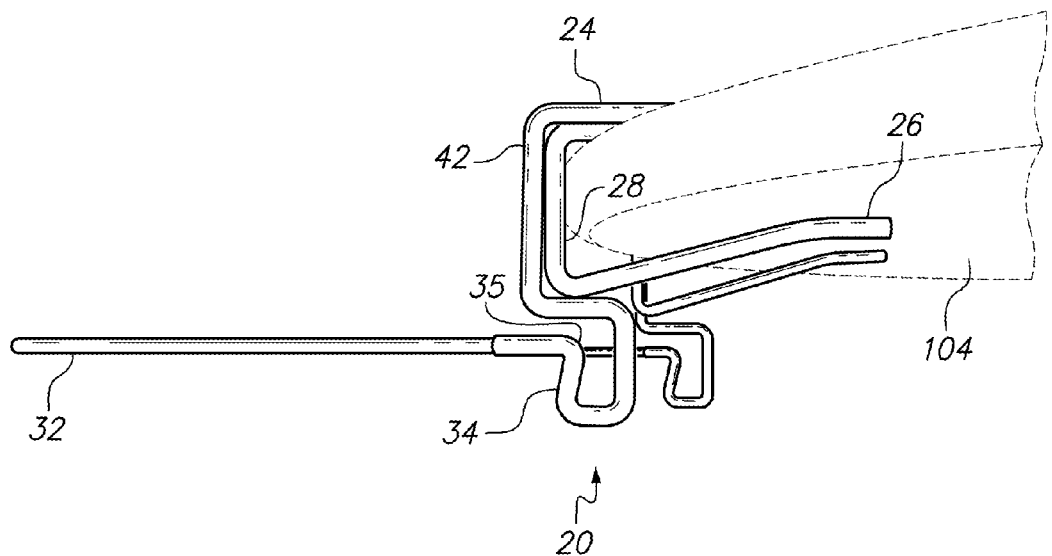
FIG. 3 is a side plan view of the support frame apparatus of FIG. 1 shown installed on an edge portion of a table.
Figure 4:
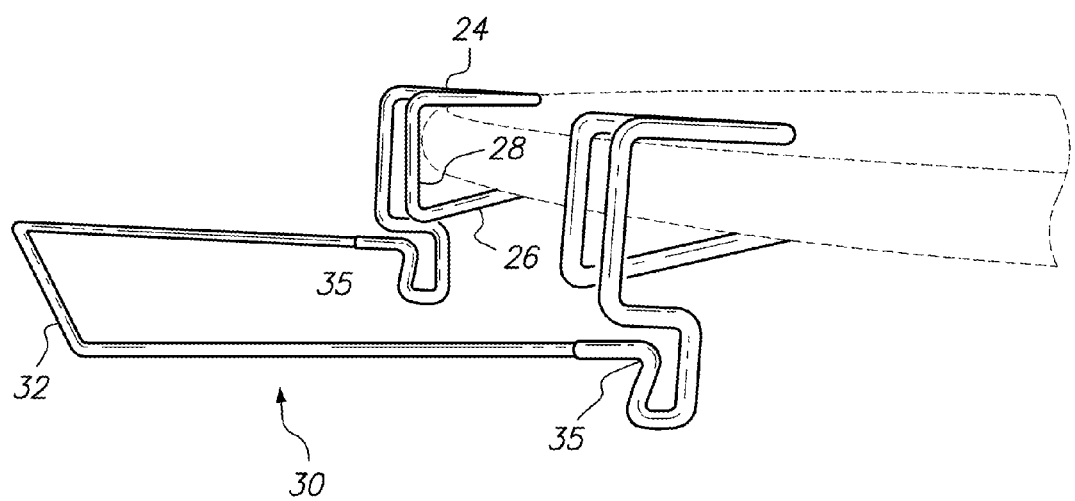
FIG. 4 is another perspective view of the support frame apparatus of FIG. 1 installed on an edge portion of a table.

Throughout the present specification, relative positional terms like 'upper', 'lower', 'front', 'rear', 'top', 'bottom', 'horizontal', 'vertical', and the like are used to refer to the orientation of the apparatus mounted on a substrate, as shown in the drawings. These relative positional terms are used in an illustrative sense to describe the depicted embodiments, and are not meant to be limitative. It will be understood that the depicted apparatus may be placed at an orientation different from that shown in the drawings, such as inverted 180 degrees or oriented transverse to that shown, and in such a case, the above-identified relative positional terms will no longer be accurate.

First Embodiment

Referring now to FIGS. 1-4 of the drawings, an apparatus according to a first illustrative embodiment hereof is shown generally at 20. The apparatus 20 is provided for mounting on an edge portion 110 of a table or similar substantially horizontal substrate 100, and for supporting a flexible plastic bag thereon, is shown generally at 20. The apparatus 320 is shown inverted in FIG. 1 for illustrative purposes, and is shown in its normal orientation in FIGS. 2-4.

The apparatus 20 may include a main body portion formed from bent wire, or alternatively, the main body portion of the apparatus 20 may be formed from a strong plastic material. Where wire is used for forming the main body portion of the apparatus, the main body portion may be formed in multiple parts hinged together so as to be foldable for shipping. In addition, where wire is used for the main body portion, all or part of the wire, particularly a gripping portion thereof may, optionally, be coated with plastisol, an elastomer, or another flexibly resilient coating material.

The apparatus 20 may be made in a size which is configured to support a standard bag of a specified volume, such as, for example, a 13-gallon kitchen-size trash bag, or a larger commercially available trash bag. The bag used may include a drawstring, but the bag, per se, does not form part of the present invention.

Alternatively, the apparatus 20 may be made in a second size, which is configured to support the common handled plastic bag used by many grocery stores and other merchants. These types of bags are sometimes referred to as "T-shirt bags", and are widely used and given away by stores for holding groceries and other commercial consumer goods. One type of commonly used T-shirt bag measures approximately 11½ inches by 6 inches by 21 inches when flat.

The apparatus 20 includes two spaced-apart gripping portions 22 for separately contacting the substrate and holding the apparatus in place on the substrate. The gripping portions may, optionally, be made from a bendable wire so that they may be bent to fit a particular application of the apparatus.

The two gripping portions 22 at each end of the apparatus are substantially identical to one another, except that they are mirror images rather than exact duplicates. For that reason, only a single gripping portion 22 is described in detail herein, with the other one being a mirror image thereof.

While the dimensions of the gripping portion may be modified to suit a particular application of the apparatus, in one variation of the first embodiment, the gripping portion could be made to extend inwardly approximately 3 inches from an outer edge of the substrate 100.

Alternatively, the gripping portion may be configured to attach to the edge of a countertop overhang, such as the part of a kitchen counter extending over the dishwasher, with only a 1 inch overhang.

Each of the gripping portions 22 includes an upper horizontal section 24 for placement above the substrate 100. In the depicted embodiment, the upper horizontal section 24 is formed in a squared-off "U" shape.

Each of the gripping portions 22 also includes a lower substrate-contacting free arm 26, for placement below the substrate, and a substantially vertical joining segment 28, which interconnects the upper horizontal section and the lower substrate-contacting free arm. The gripping portion 22 may be configured to attach the apparatus 20 to a substrate 100 in cantilevered fashion, while contacting the substrate from both above and below.

The apparatus 20 also includes a bag-supporting portion 30, which is sized and configured to support an open end portion of a flexible plastic bag 200 of a predetermined size thereon. The bag-supporting portion 30 includes a generally horizontally-extending outer loop 32. In the depicted embodiment, the outer loop 32 has three sides, and defines a rectangle with one open side.

Alternatively, if so desired, the outer loop 32 may be formed in a round shape, an oval shape, another geometric shape such as hexagonal or octagonal, or any other preferred shape which is capable of supporting a flexible bag thereon. Any of these shapes, if adapted to be used as the bag-supporting portion 30 hereof, may include an open section between the gripping portions 22. This open section allows the apparatus 20 to be formed from a single piece of wire, but does not interfere with the ability of the apparatus to stably support an open upper end of a plastic bag thereon.

The bag-supporting portion 30 also includes a pair of downwardly-extending short portions 34, with one of the downwardly-extending short portions 34 attached to the outer loop 32 at each end thereof. The downwardly-extending short portions 34 extend below the level of the outer loop portion.

Optionally, each of the downwardly-extending short portions 34 may be oriented at an angle relative to a straight vertical line, in order to help retain the bag in place on the bag-supporting portion 30. Another way of describing this geometry is that downwardly-extending short portion 34 and the segment of the outer loop 32 to which it is attached cooperate to define an acute angle. A bag-retaining projection 35 is defined at the corner formed between the outer loop portion 32 and the short portion 34 at each end of the outer loop portion.

The bag-supporting portion is designed and configured to provide a certain amount of designed-in interference with a bag when the bag is placed thereon, in order to cause tension so as to securely hold the bag thereon, even if the bag is full of material.

The apparatus 20 also includes a connecting portion 40 interconnecting the bag-supporting portion 30 and the gripping portion 22. The connecting portion 40 extends upwardly from a lower end of the downwardly-extending short portion 34, and includes a vertical segment 42 disposed parallel to, and having approximately the same length as the first substantially vertical joining segment 28.

Figure 5:
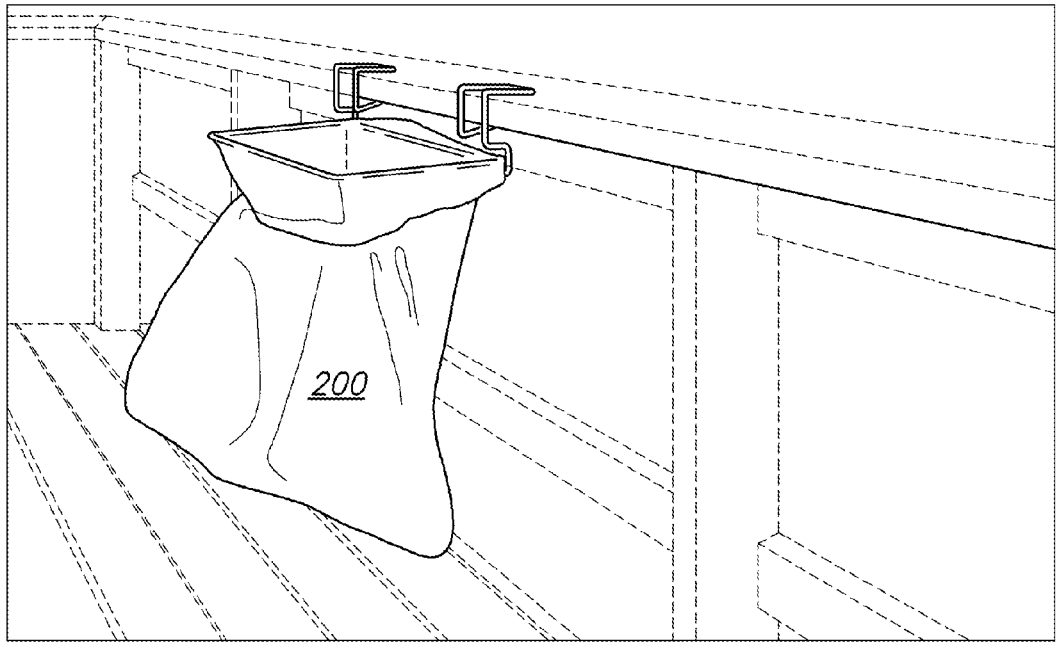
FIG. 5 is a perspective view showing the bag-supporting frame apparatus of FIG. 1 being used to mount a trash bag on a horizontal deck railing.

FIG. 5 shows the bag-supporting frame apparatus 20 being used to mount a trash bag on a horizontal deck railing.

Figure 6:
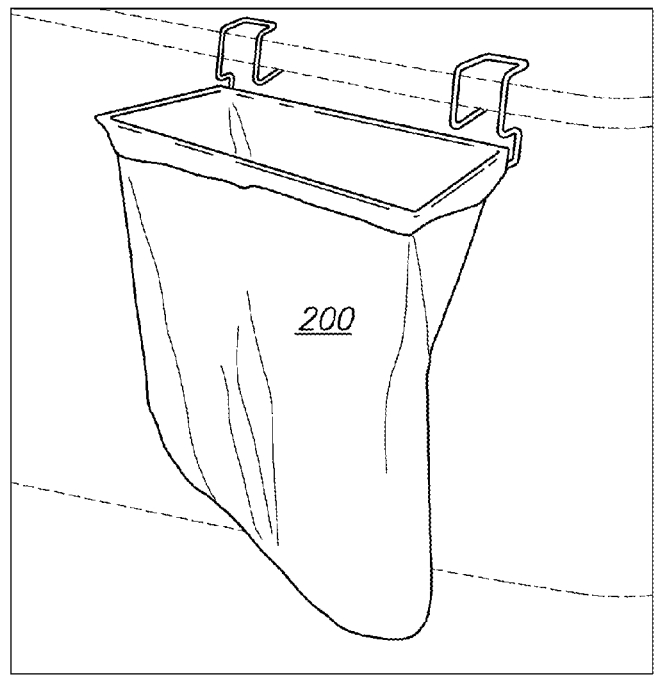
FIG. 6 is a perspective view showing the bag-supporting frame apparatus of FIG. 1 being used to mount a trash bag on a horizontal edge portion of a kitchen counter top.

FIG. 6 shows the bag-supporting frame apparatus 20 being used to mount a trash bag on a horizontal edge portion of a kitchen counter top.

Figure 7:
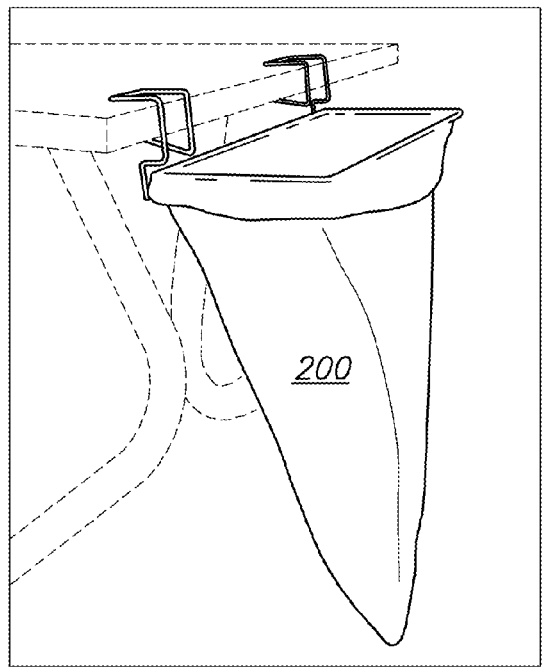
FIG. 7 is a perspective view showing the bag-supporting frame apparatus of FIG. 1 being used to mount a trash bag on an end portion of a picnic table.

FIG. 7 shows the bag-supporting frame apparatus 20 being used to mount a trash bag on an end portion of a picnic table.

Figure 18:
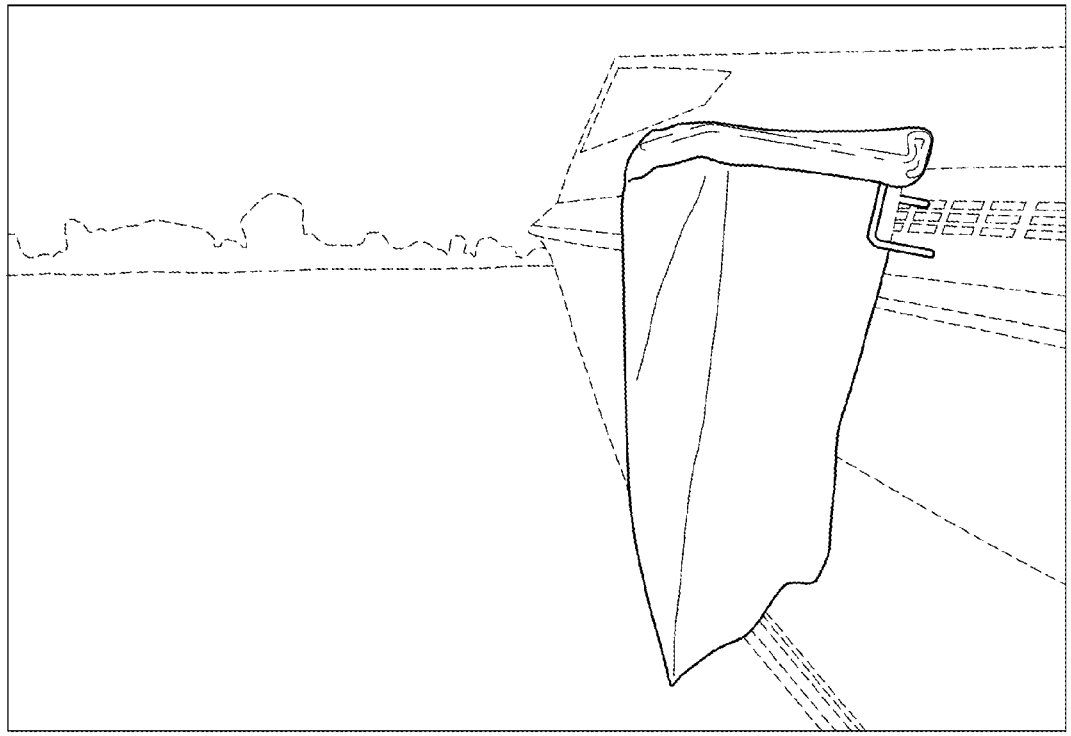
FIG. 18 is a first perspective view of an installation where a bag-supporting frame apparatus according to FIGS. 1-4 has been attached to a side trim component of a power boat.
Figure 19:
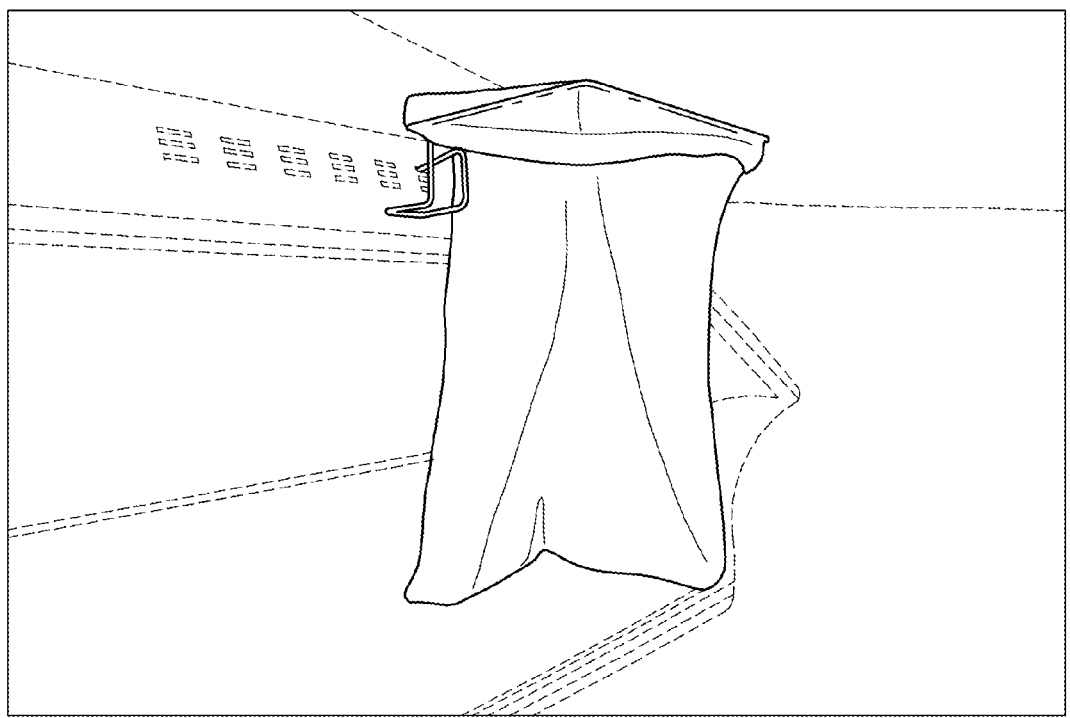
FIG. 19 is a second perspective view of an installation where the bag-supporting frame apparatus hereof has been attached to a side trim component of a power boat.
Figure 20:
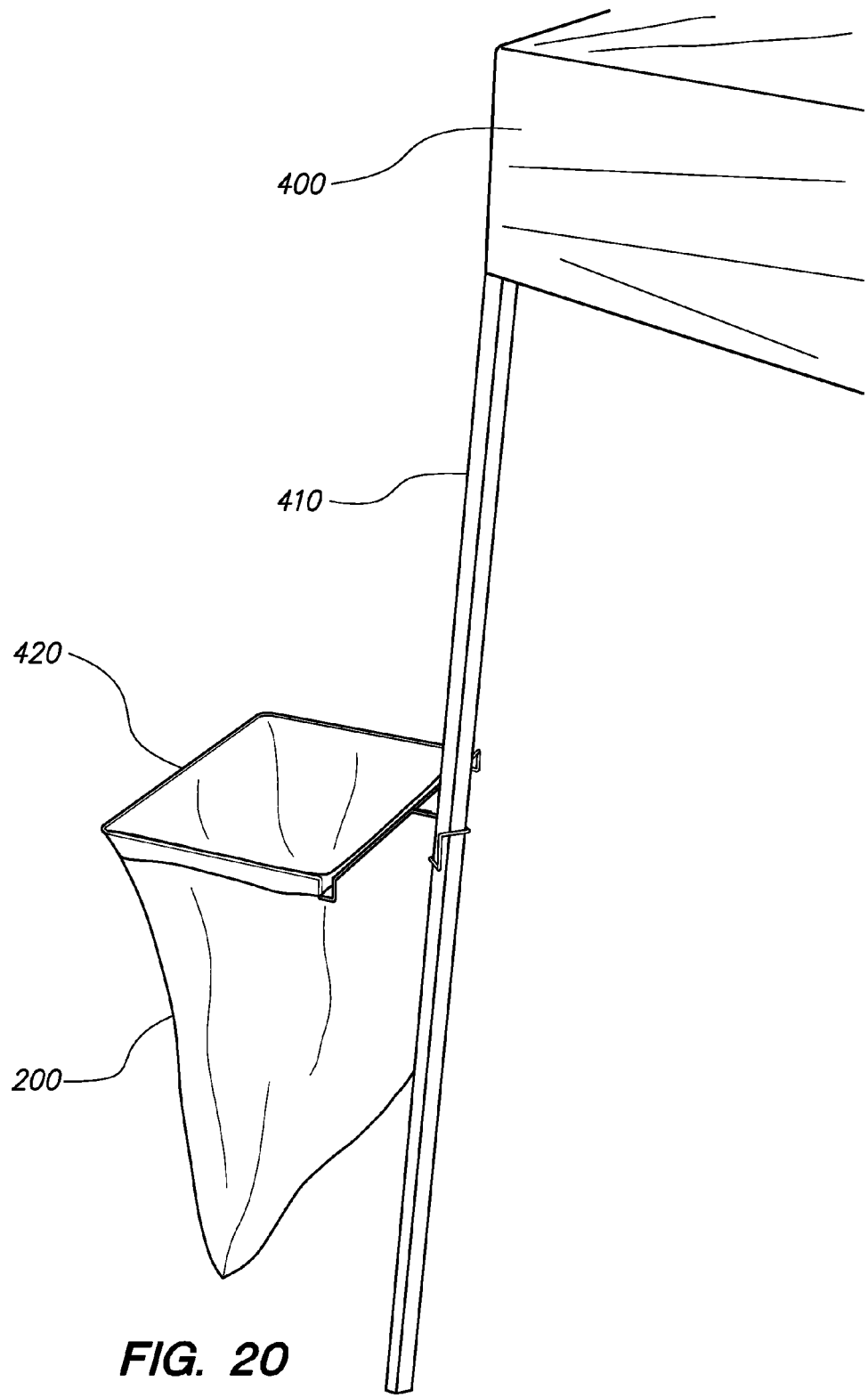
FIG. 20 is an environmental perspective view of a fourth embodiment of the invention shown installed on a support post of a portable canopy apparatus with a flexible bag placed thereon.
Figure 21:
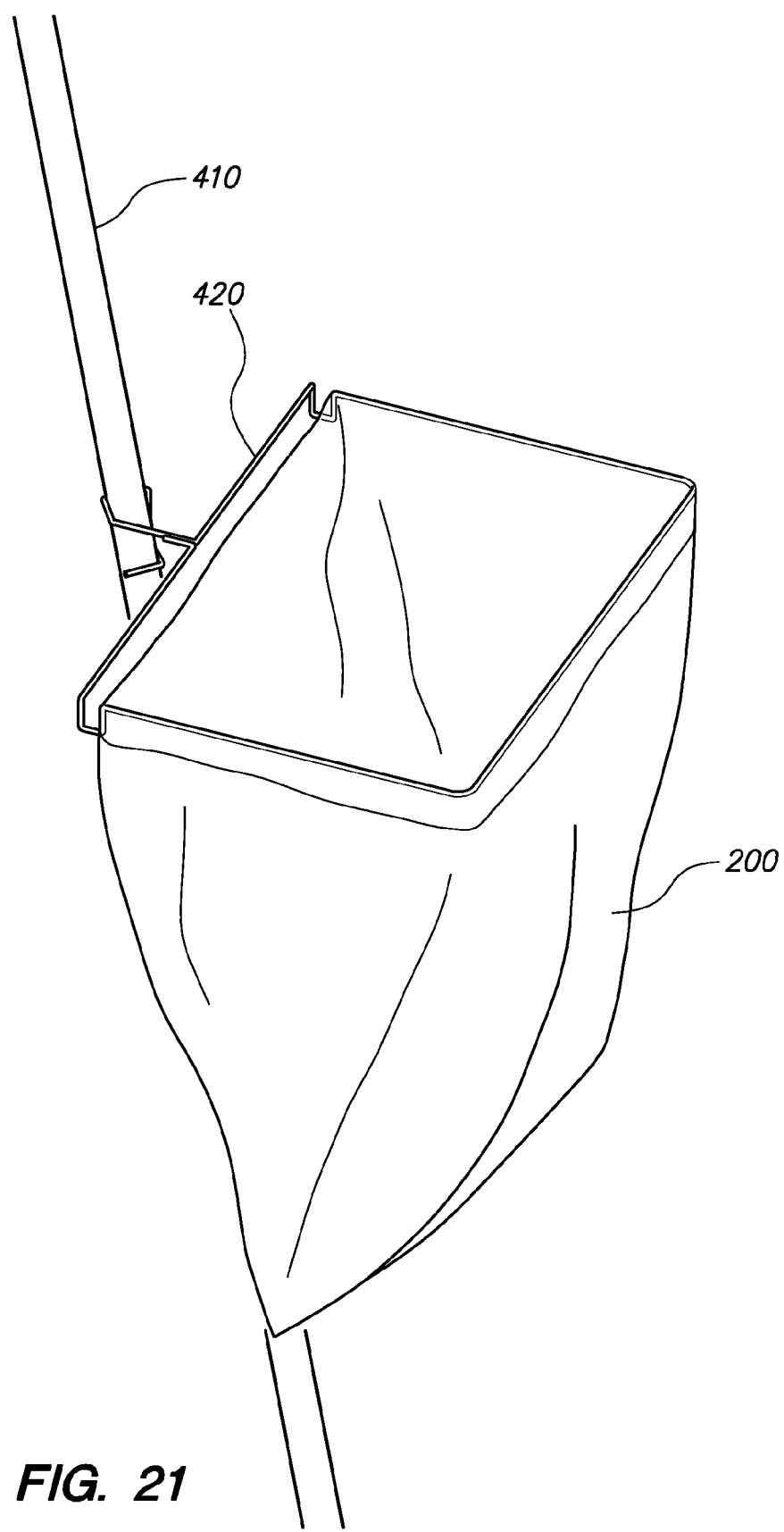
FIG. 21 is a perspective view of the bag, apparatus and support post of FIG. 20.
Figure 22:
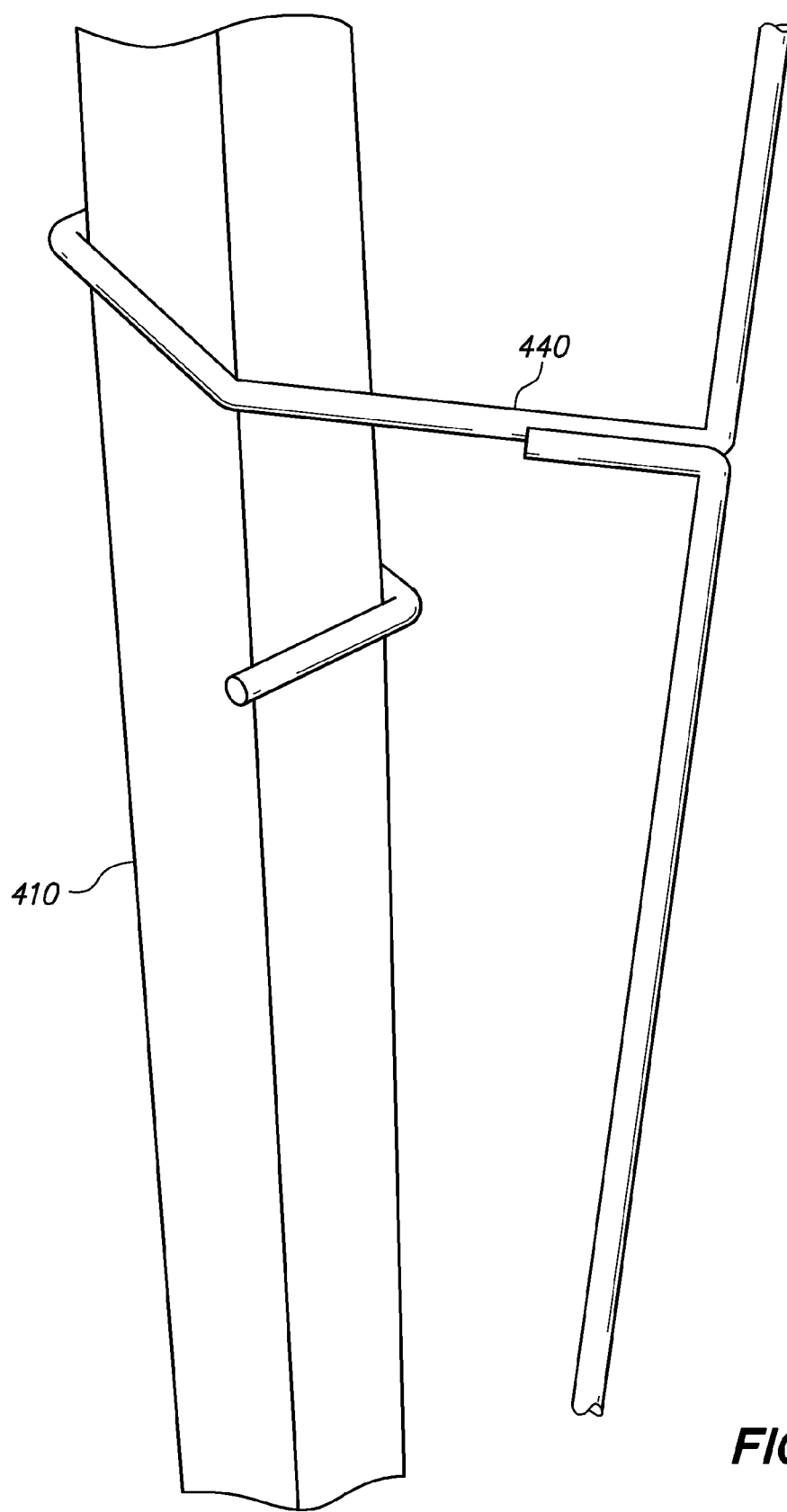
FIG. 22 is a detail perspective view of a portion of the bag, apparatus and support post of FIGS. 20-21.
Figure 23:
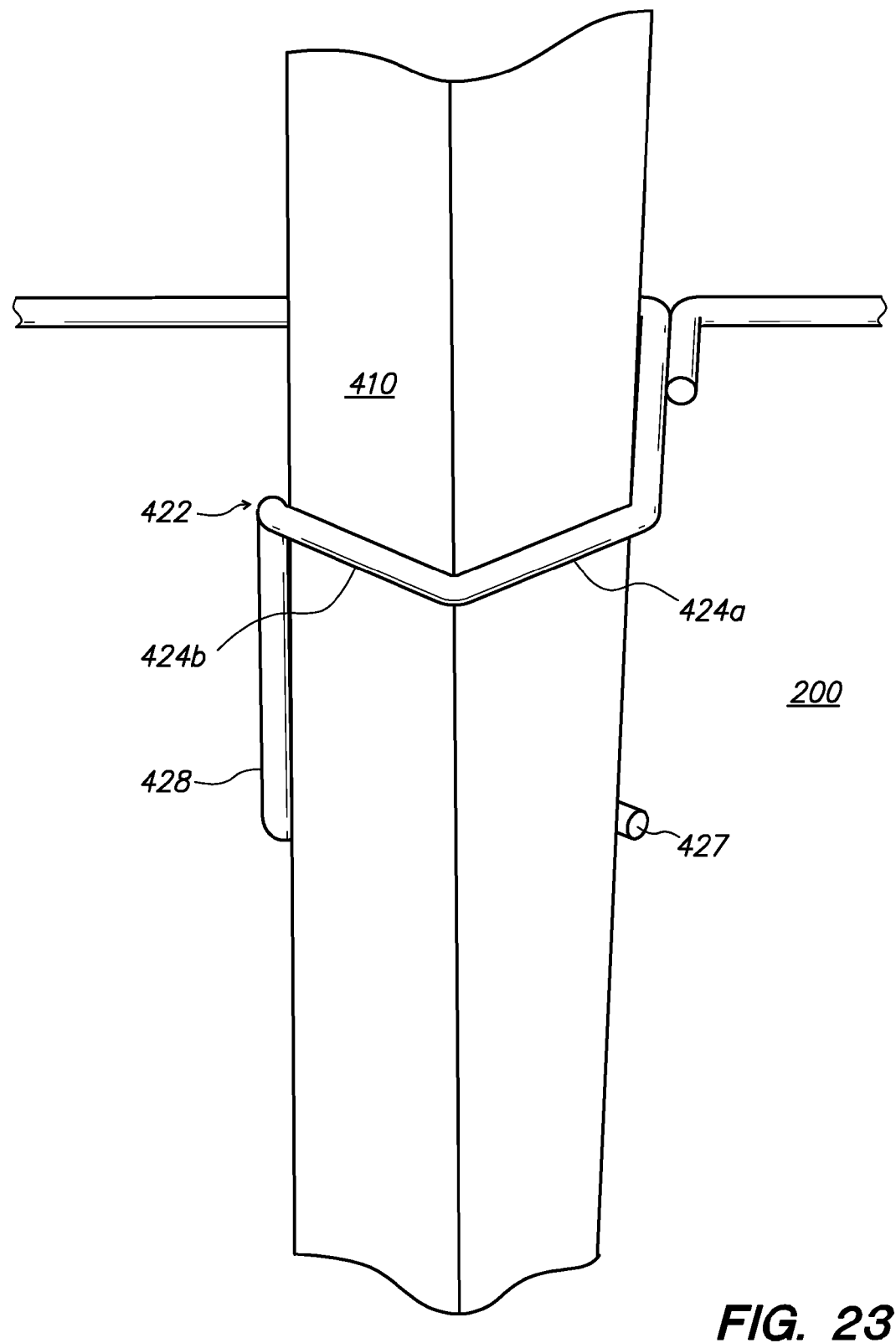
FIG. 23 is another detail perspective view of the bag, apparatus and support post of FIG. 22, showing a gripping portion of the apparatus mounted on the support post.
Figure 24:
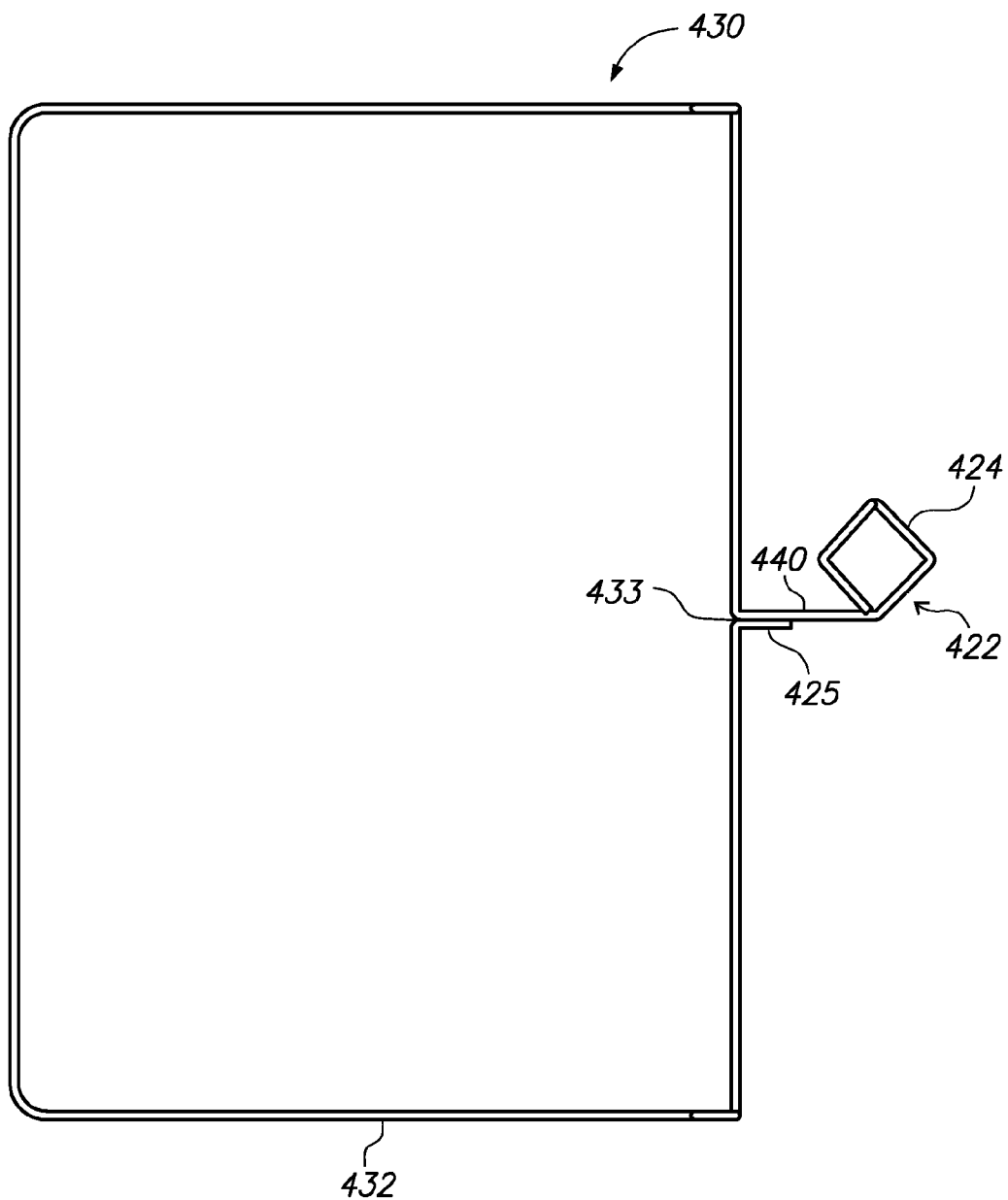
FIG. 24 is a bottom plan view of the bag-supporting apparatus according to the fourth embodiment.
Figure 25:
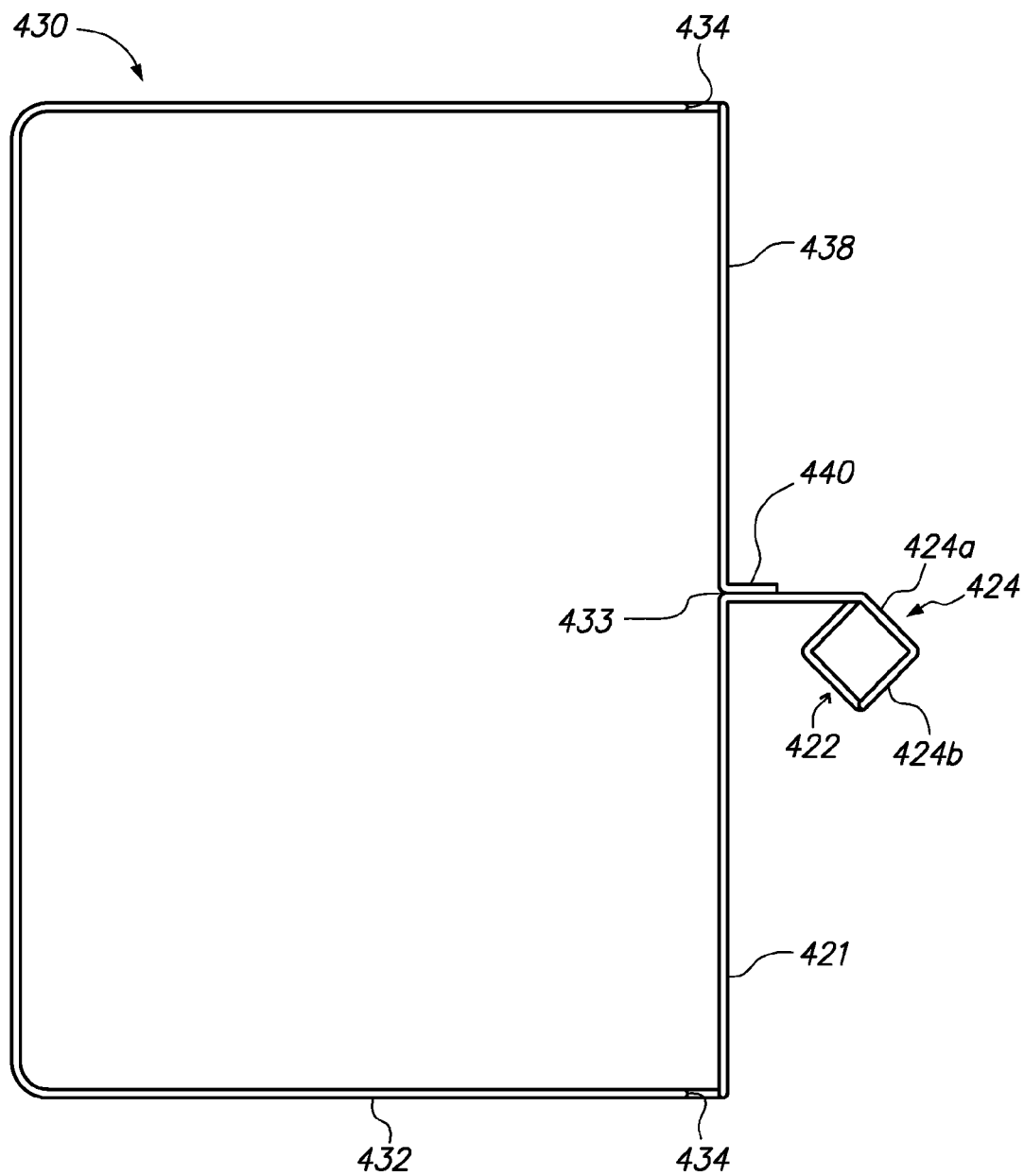
FIG. 25 is a top plan view of the bag-supporting apparatus according to the fourth embodiment.
Figure 26:
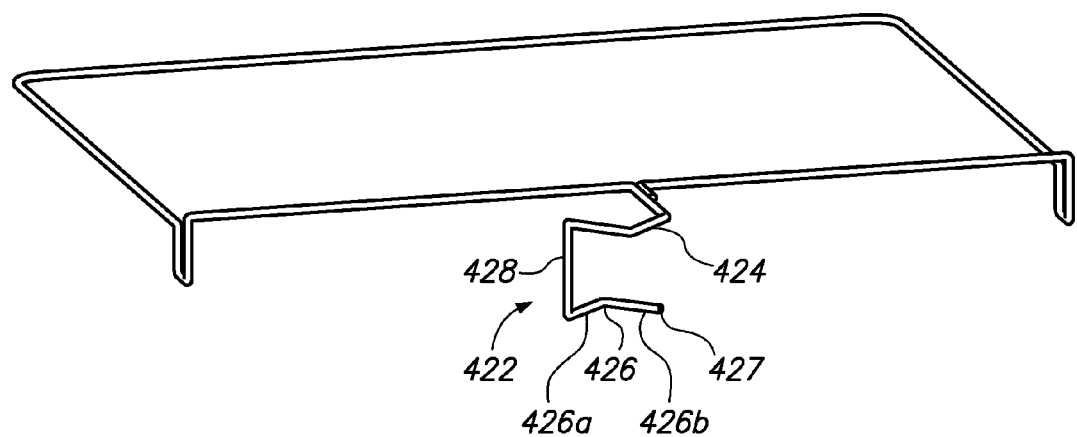
FIG. 26 is a perspective view of the bag-supporting apparatus of FIGS. 24-25.

FIGS. 18-19 show an installation where the bag-supporting frame apparatus 20 has been attached to a side trim component of a power boat.

Optional Cover Panel Assembly

Figure 14:
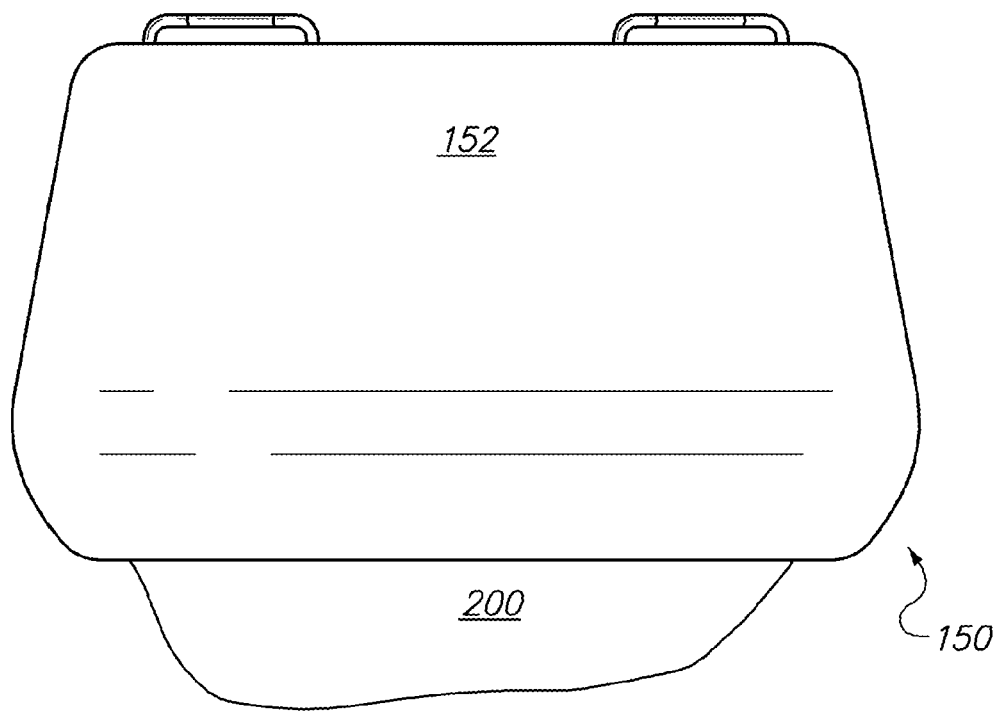
FIG. 14 is a perspective view of the support frame apparatus of FIG. 1 installed on an edge portion of a table with a bag installed thereon, and also showing an optional cover panel assembly usable as a component part of the apparatus.
Figure 15:
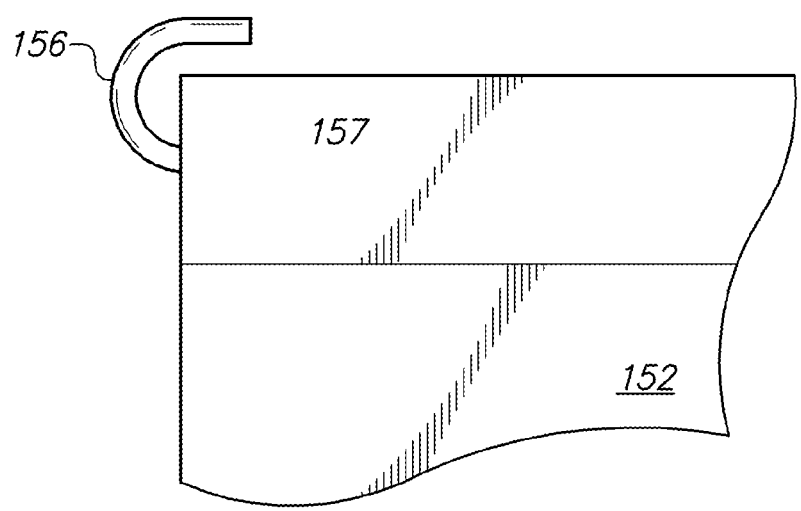
FIG. 15 is a detail plan view of a corner portion of the cover panel assembly of FIG. 14.
Figure 16:
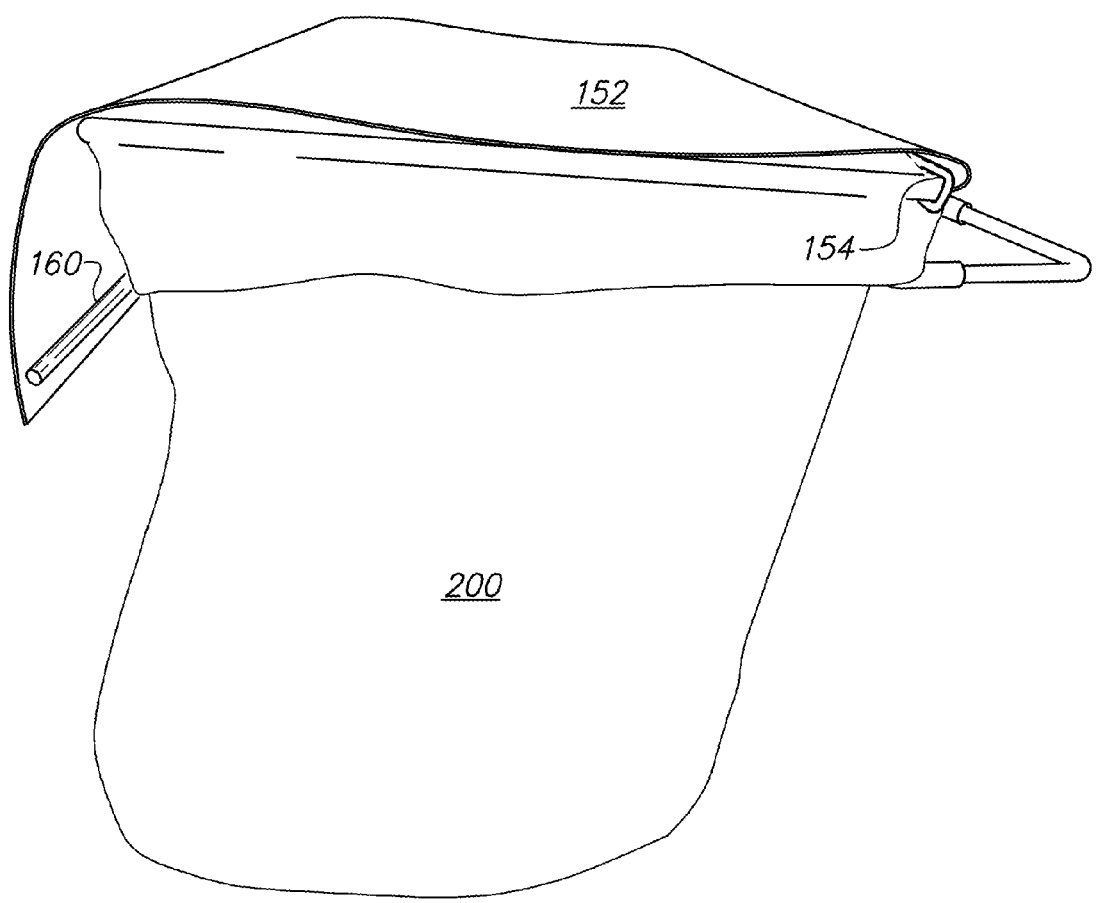
FIG. 16 is a side perspective view of the support frame apparatus, bag and cover panel assembly of FIG. 14.
Figure 17:
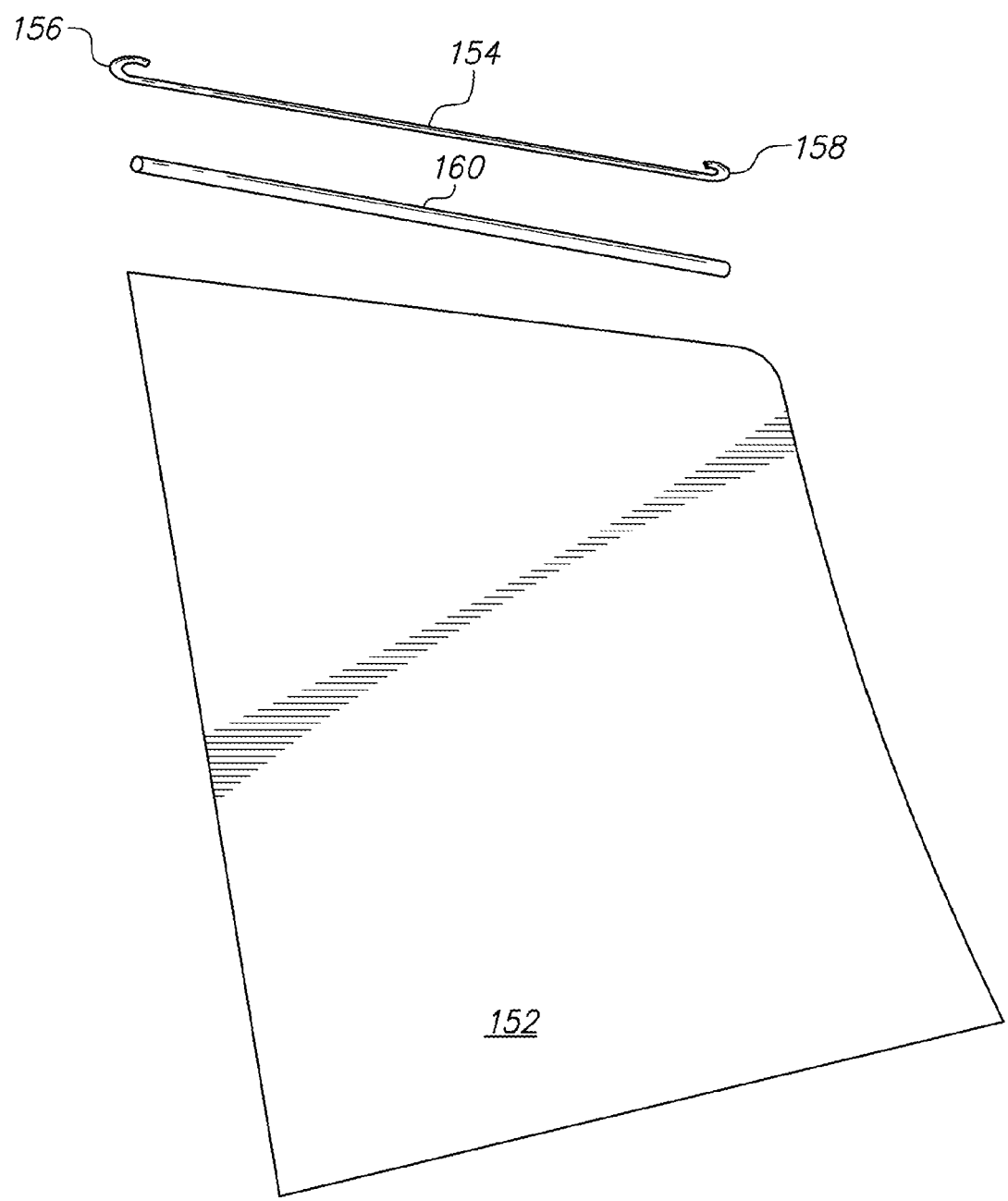
FIG. 17 is an exploded perspective view showing components of the cover panel assembly.

Referring now to FIGS. 14-17, an optional cover panel assembly 150, which may be used in conjunction with the bag-supporting frame apparatus 20, is shown. Where the cover panel assembly 150 is used on the bag-supporting frame apparatus 20 after a bag 200 has been installed thereon, the cover panel is usually oriented as shown in FIGS. 14 and 16, covering the top of the bag and the outer loop portion 32. To add material to the bag, the cover panel may simply be lifted out of the way by a user when adding material to the bag 200, and then the cover panel is placed back into position.

The cover panel assembly 150 includes a main panel member 152, which is preferably formed from a strong, flexible plastic sheet. The cover panel assembly 150 also includes a mounting rod 154, which is slightly wider than the main panel member 152. The mounting rod 154 includes two spaced apart end portions 156, 158, and each of these end portions is bent around substantially in a U-shape.

The mounting rod 154 is attached to the main panel member 152 by looping a short back end portion of the main panel member 152 around the mounting rod, and heat-fusing the back edge of the main panel member to the area it contacts to form a welded seam 157.

To install the cover panel assembly 150 to the apparatus 20, these U-shaped end portions 156, 158 of the mounting rod 154 are hooked around the lower ends of the connecting portions' two opposed vertical segments 42.

Optionally, the cover panel assembly 150 may also include a weighted rod 160 for placement at an end of the main panel member 152 opposite to the mounting rod 154, and for keeping the main panel member 152 in place covering the top of the bag 200. Where used, the weighted rod 160 may be attached to the main panel member 152 in a manner similar to that described above in connection with the mounting rod 154. Those in the art will be able to figure out other ways of attaching the weighted rod 160 to the main panel member 152.

Alternatively, if desired, the end of the main panel member 152 opposite to the mounting rod 154 may have one part of a hook-and-loop fastener affixed thereto (One commonly known, commercially available hook-and-loop fastener is sold under the trade name "VELCRO"). Where a hook-and-loop fastener is used, an outer edge portion of the bag-supporting member 130 carries an optional fastener-supporting bracket (not shown) with another, complimentary part of the hook-and-loop fastener affixed thereto.

The cover panel assembly 150 described herein may also be used with all other embodiments of the inventive support frame apparatus, as needed.

Second Embodiment

Figure 9:
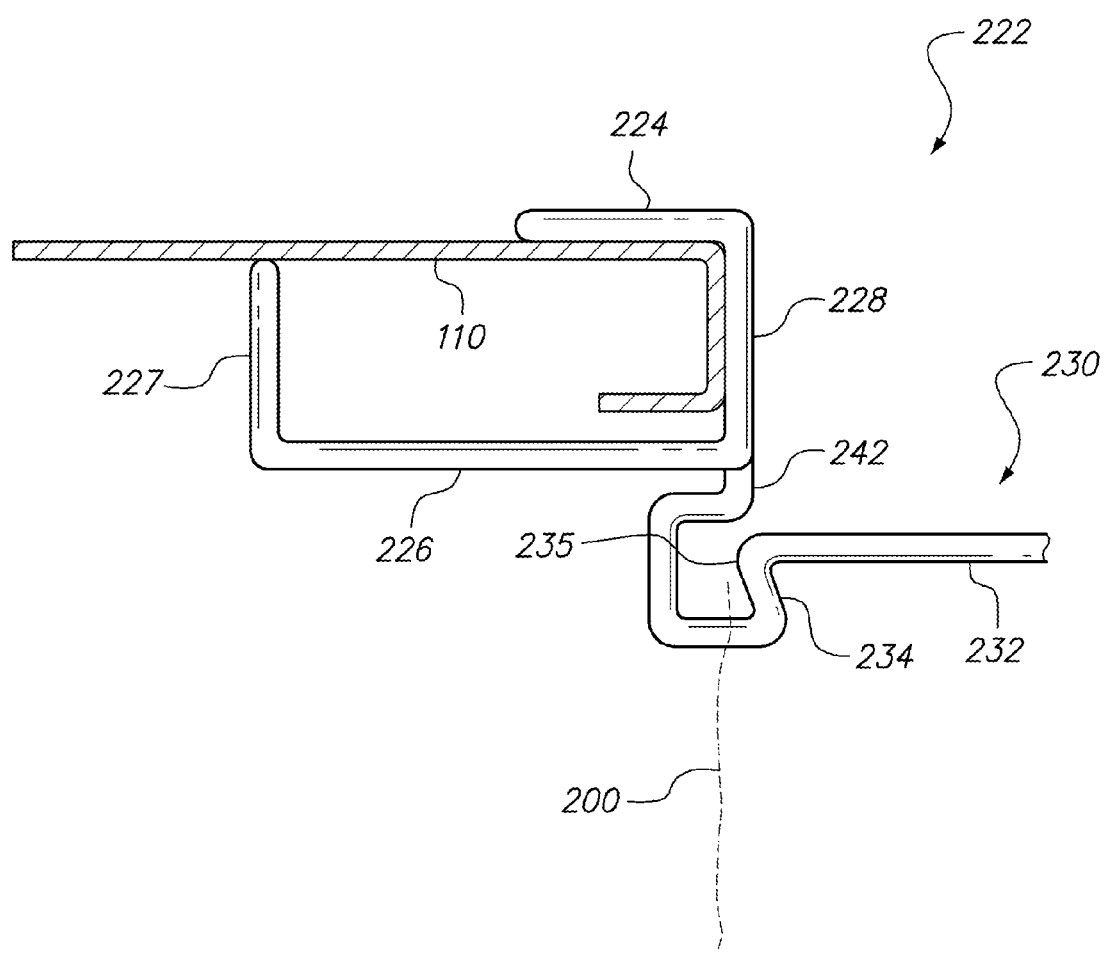
FIG. 9 is a detail side plan view of a gripping portion which is a component of a bag-supporting frame apparatus according to a modified embodiment of the invention.
Figure 10:
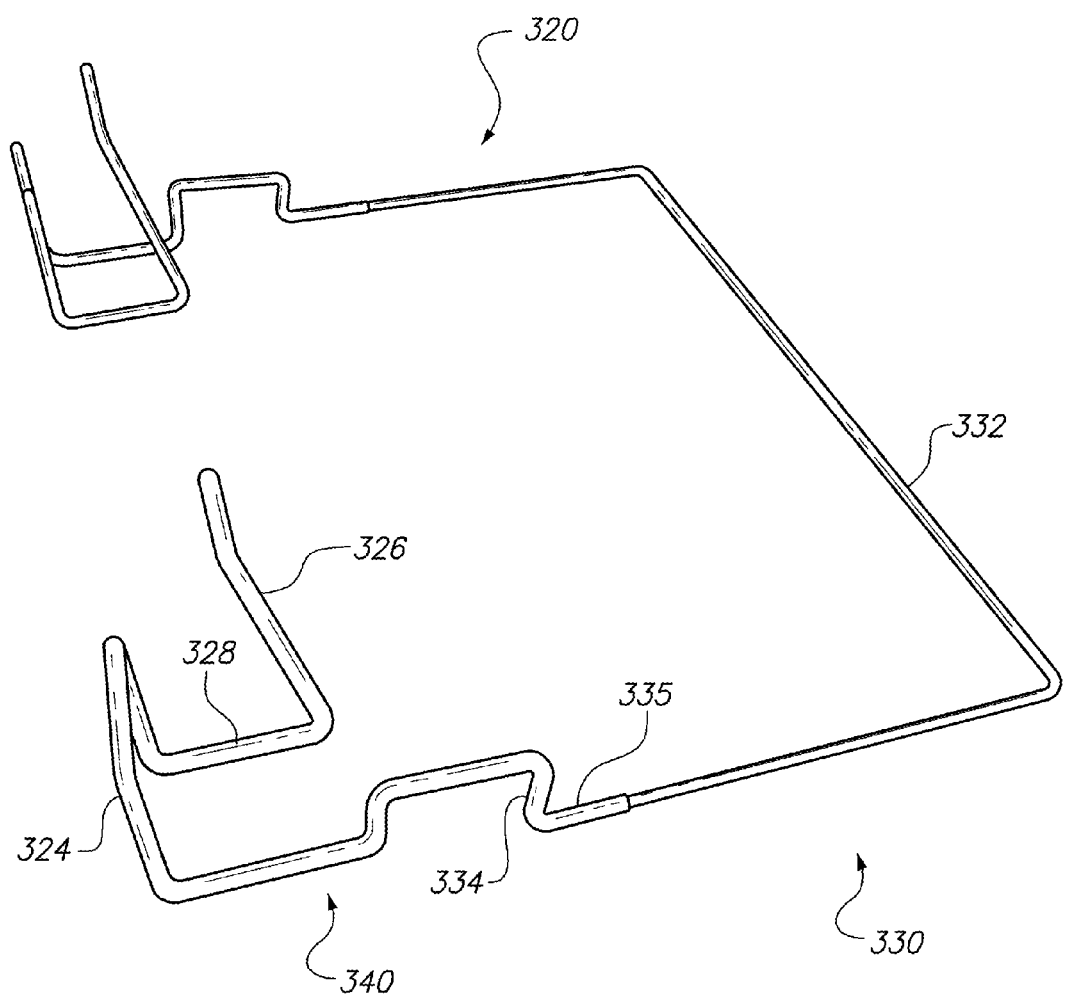
FIG. 10 is a perspective view of a support frame apparatus according to a third embodiment of the invention, shown inverted and unattached to any substrate.
Figure 11:
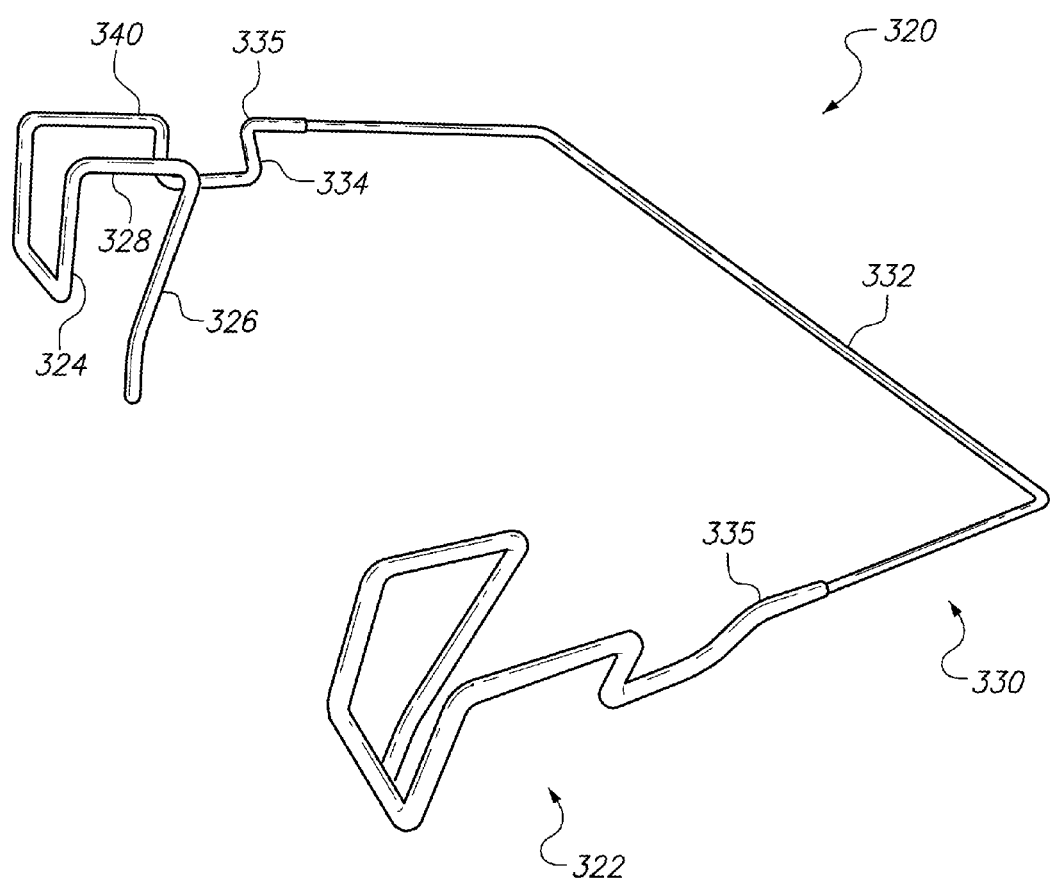
FIG. 11 is a perspective view of the support frame apparatus of FIG. 10 shown in the normal orientation thereof, ready for installation on a substrate.
Figure 12:
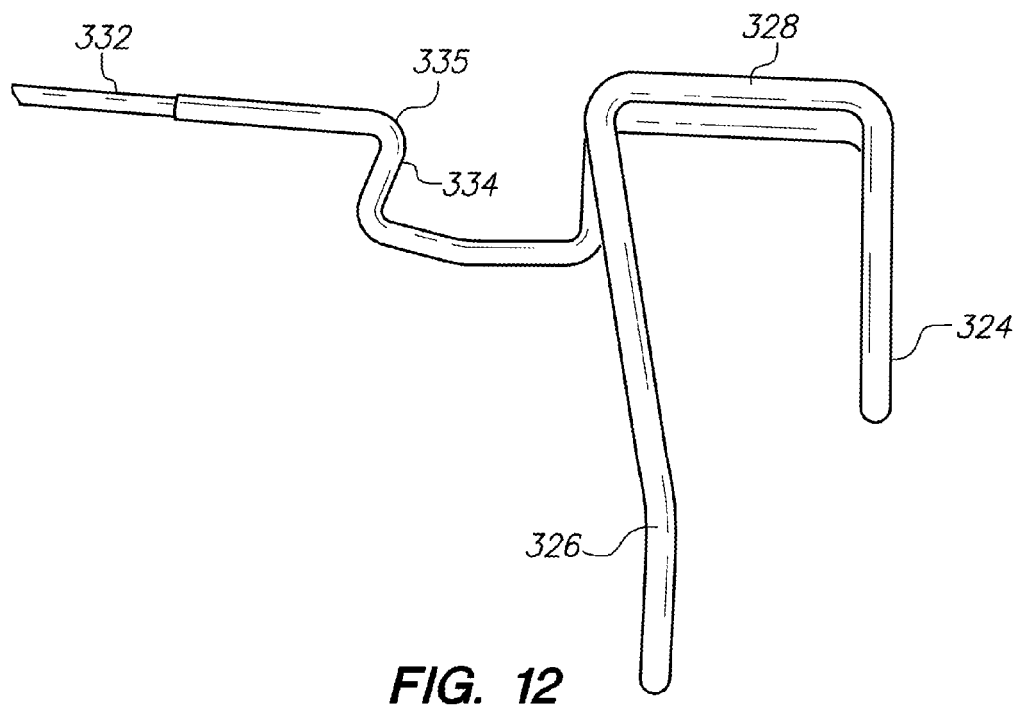
FIG. 12 is a detail side plan view of a gripping portion of the support frame apparatus of FIGS. 10-11.
Figure 13:
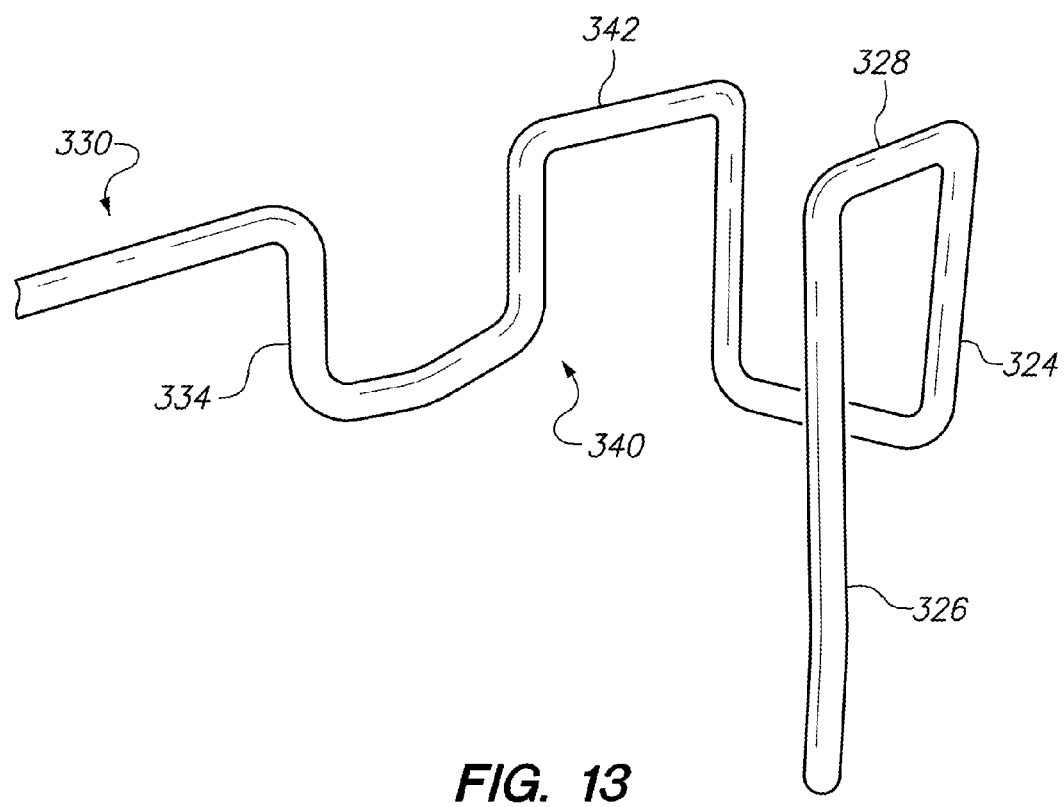
FIG. 13 is a detail perspective view of a gripping portion of the support frame apparatus of FIGS. 10-11.

Referring now to FIG. 9, a gripping portion 222 of a second embodiment of a bag-supporting apparatus 220 is shown, where this embodiment is configured and adapted to be used with a stainless steel countertop having a transverse J-shaped cross-sectional shape as a substrate 110, as shown. Stainless steel countertops of this type are widely used in restaurants and in the food service industry. The bag-supporting apparatus 220 according to the second embodiment is exactly the same as the bag-supporting apparatus 20 according to the first embodiment, except that the two spaced-apart gripping portions 222 have a different configuration from the gripping portions 22 according to the first embodiment.

Each of the gripping portions 222 in the second embodiment includes an upper horizontal section 224 for placement above the substrate 110. The upper horizontal section 224 may also be formed in a squared-off "U" shape. Each of the gripping portions 222 also includes a lower substrate-contacting free arm 226, for placement below the substrate, and in this second embodiment, the free arm is formed substantially in an L-shape including a vertically extending end portion 227. The free arm 226 is formed in an L-shape in this way in order to receive and accommodate the J-shape of this particular substrate, as shown.

Each of the gripping portions 222 of the second embodiment also includes a substantially vertical joining segment 228, which interconnects the upper horizontal section 224 and the lower substrate-contacting free arm 226. The gripping portion 222 is configured to attach the apparatus 220 to the substrate 110 in cantilevered fashion, while contacting the substrate from both above and below.

The apparatus 220 also includes a bag-supporting portion 230, which is sized and configured to support an open end portion of a flexible plastic bag 200 of a predetermined size thereon. The bag-supporting portion 230 includes a generally horizontally-extending outer loop 232.

Third Embodiment

Another modified embodiment of a bag-supporting frame apparatus according to the present invention may be used to mount a flexible plastic bag on a substantially vertical substrate, such as a wooden fence panel, the top of a door panel, or a closed truck tailgate.

Referring now to FIGS. 10-13 of the drawings, an apparatus according to a third illustrative embodiment hereof is shown generally at 320. The apparatus 320 is shown inverted in FIG. 10 for illustrative purposes, and is shown in its normal orientation in FIG. 11. The apparatus 320 is provided for mounting on an upper edge portion of a door, fence panel, closed truck tailgate, or similar substantially vertically oriented panel substrate, and for supporting a flexible plastic bag thereon. The apparatus 320 may include a main body portion formed from a single piece of bent wire, or alternatively, the main body portion of the apparatus 320 may be formed from a strong plastic material.

Where wire is used for forming the main body portion of the apparatus, all or part of the wire, particularly a gripping portion thereof may, optionally, be coated with plastisol, an elastomer, or another flexibly resilient coating material.

Similar to the apparatus 20 according to the first embodiment, this apparatus 320 may be made in a size which is configured to support any one of a number of specific bags. Unfortunately, any one apparatus works with only a single size of bag. The bag used may include a drawstring, but the bag, per se, does not form part of the present invention.

The apparatus 320 includes two spaced-apart gripping portions 322 for separately contacting the substrate and holding the apparatus in place on the substrate. The two gripping portions 322 at each end of the apparatus are substantially identical to one another, except that they are mirror images rather than exact duplicates. For that reason, only a single gripping portion 322 is described in detail herein, with the other one being a mirror image thereof.

Each of the gripping portions 322 includes a distal section 324 for placement contacting the back side of the substrate panel. In the depicted embodiment, the distal section 324 is formed in a squared-off "U" shape.

Each of the gripping portions 322 also includes a substrate-contacting free proximal arm 326, for placement contacting the near surface of the substrate panel, and a joining segment 328, which interconnects the distal section 324 and the substrate-contacting free proximal arm 326. The gripping portion 322 may be configured to attach the apparatus 320 to a substrate panel in cantilevered fashion (with the two spaced-apart gripping portions providing two areas of support), while contacting the substrate panel from three sides thereof, such as the front surface, the back surface and a top edge portion of the substrate.

The apparatus 320 also includes a bag-supporting portion 330, which is sized and configured to support an open end portion of a flexible plastic bag 200 of a predetermined size thereon. The bag-supporting portion 330 includes a generally horizontally-extending outer loop 332. In the depicted embodiment, the outer loop 332 has three sides, and defines a rectangle with one open side.

Alternatively, if so desired, the outer loop 332 may be formed in a round shape, an oval shape, another geometric shape such as hexagonal or octagonal, or any other preferred shape which is capable of supporting a flexible bag thereon. Any of these shapes, if adapted to be used as the bag-supporting portion 330 hereof, may include an open section between the gripping portions 322. This open section allows the apparatus 320 to be formed from a single piece of wire, but does not interfere with the ability of the apparatus to stably support an open upper end of a plastic bag 200 thereon.

The bag-supporting portion 330 also includes a pair of downwardly-extending short portions 34, with one of the downwardly-extending short portions 334 attached to the outer loop 332 at each end thereof. Optionally, each of the downwardly-extending short portions 334 may be oriented at an angle relative to a straight vertical line, in order to help retain the bag in place on the bag-supporting portion 330. Another way of describing this geometry is that downwardly-extending short portion 334 and the segment of the outer loop 332 to which it is attached cooperate to define an acute angle. The downwardly-extending short portions 334 extend below the level of the outer loop portion 332.

A bag-retaining projection 335 is defined at the corner formed between the outer loop portion 332 and the downwardly-extending short portion 334 at each end of the outer loop portion 332.

The bag-supporting portion 330 is designed and configured to provide a certain amount of designed-in interference with a bag 200 when the bag is placed thereon, in order to cause tension so as to securely hold the bag thereon, even if the bag is full of material.

The apparatus 320 also includes a connecting portion 340 interconnecting the bag-supporting portion 330 and the gripping portion 322. The connecting portion 340 extends substantially horizontally away from a lower end of the downwardly-extending short portion 334, and includes a horizontal bar segment 342 disposed parallel to, and having approximately the same length as the first substantially horizontal joining segment 328.

Many other adaptations, modifications and uses for the bag-supporting frame apparatus hereof will occur to those in the relevant art.

Fourth Embodiment

Referring now to FIGS. 20-30 of the drawings, a bag-supporting frame apparatus according to a fourth illustrative embodiment hereof is shown generally at 420. The bag-supporting frame apparatus 420 is provided for mounting on a medial portion of a vertically extending support pole 410 or similar substrate, which may alternatively be a thin tree trunk or branch. The substrate may have either a square or rounded cross-sectional shape. In the depicted embodiment, the support pole 410 is a component of a support frame portion of a portable pop-up canopy 400. However, the bag-supporting frame apparatus 420 according to the fourth embodiment is usable on vertically extending poles of tents, screen houses, and the like, as well as tree trunks and branches.

The bag-supporting frame apparatus 420 is provided for supporting a flexible plastic bag 200 thereon, in a manner similar to each of the first three embodiments. The apparatus 420 is shown inverted in FIG. 24 for illustrative purposes, and is shown in its normal orientation in FIGS. 25-27.

The apparatus 420 may include a main body portion 421 formed from bent wire, or alternatively, the main body portion 421 of the apparatus 420 may be formed from a strong plastic material. Where wire is used for forming the main body portion 421 of the apparatus, the main body portion may be formed in multiple parts hinged together so as to be foldable for shipping. In addition, where wire is used for the main body portion 421, all or part of the wire, particularly a gripping portion thereof may, optionally, be coated with plastisol, an elastomer, or another flexibly resilient coating material.

The apparatus 420 may be made in a size which is configured to support a standard bag of a specified volume, such as, for example, a 13-gallon kitchen-size trash bag, or a larger commercially available trash bag. The bag used may include a drawstring, but the bag, per se, does not form part of the present invention.

Alternatively, the apparatus 420 may be made in a second size, which is configured to support the common handled plastic bag used by many grocery stores and other merchants, previously described herein as "T-shirt bags", and these bags are widely used and given away by stores for holding groceries and other commercial consumer goods.

The apparatus 420 includes a single, centrally located gripping portion 422 for contacting the substrate's support pole 410, and for holding the apparatus in place on the substrate. The gripping portion 422 may, optionally, be made from a bendable wire so that it may be adjustably bent to fit a particular application of the apparatus.

While the dimensions of the gripping portion 422 may be modified to suit a particular application of the apparatus, in one variation of the first embodiment, the gripping portion could be made to extend inwardly from the main body portion 421 of the apparatus so as to be located approximately 3 inches therefrom. In one illustrative embodiment, the gripping portion is configured to fit on a support pole which is in a range of approximately 1-3 inches in diameter.

In this fourth embodiment, the gripping portion 422 includes an upper horizontal section 424 (see FIG. 23) for placement extending behind the support pole 410 of the substrate 400, and for contacting the substrate at a first level. In the depicted embodiment, the upper horizontal section 424 is formed substantially in a "V" shape, as shown, including a first segment 424a and a second segment 424b formed integrally with and oriented substantially perpendicular to the first segment.

The gripping portion 422 also includes a lower substrate-contacting section 426 (see FIG. 26), for placement contacting the substrate 410 at a level below the upper horizontal section 424, and the lower substrate-contacting section 426 is also formed substantially in a "V" shape, as shown, including a first segment 426a and a second segment 426b formed integrally with and oriented substantially perpendicular to the first segment. The second segment 426b of the lower substrate-contacting section 424 provides a free end 427. The gripping portion 422 also includes a substantially vertical joining segment 428, which interconnects the upper horizontal section 424 and the lower substrate-contacting section 426.

The gripping portion 422 may be configured to attach the apparatus 420 to a substrate 400 in cantilevered fashion, while simultaneously contacting the substrate at both front and rear surfaces of the support pole 410.

The apparatus 420 also includes a bag-supporting portion 430, which is sized and configured to support an open end portion of a flexible plastic bag 200 of a predetermined size thereon. The bag-supporting portion 430 includes a generally horizontally-extending outer loop 432, which may be substantially flat or disposed extending substantially along a single plane. In the depicted embodiment, the outer loop 432 has three sides, and cooperates with an integrally formed connecting rod 438 of a connecting portion 433 to define a closed rectangle, as shown.

Alternatively, if so desired, the outer loop 432 may be formed in a round shape, an oval shape, another geometric shape such as hexagonal or octagonal, or any other preferred shape which is capable of supporting a flexible bag thereon. The main body portion of the apparatus 420 may be formed from a single piece of wire joined to itself at a weld point 425, but this does not interfere with the ability of the apparatus to stably support an open upper end of a plastic bag thereon.

Figure 27:
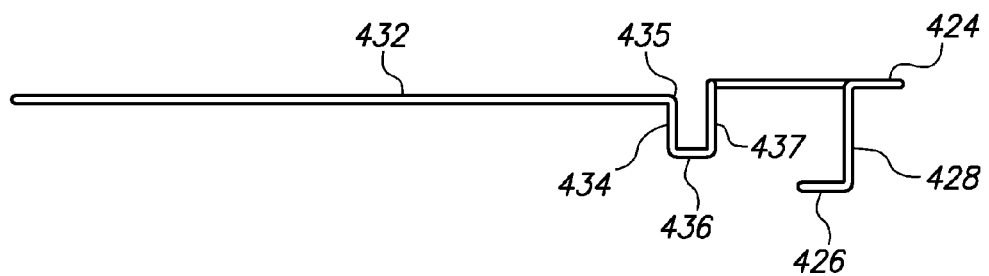
FIG. 27 is a side plan detail view of part of the bag-supporting apparatus of FIGS. 24-26.

As seen in FIG. 27, the bag-supporting portion 430 also includes a pair of spaced-apart downwardly-extending short portions 434, with one of the downwardly-extending short portions 434 attached to each end of the outer loop 432, respectively. The downwardly-extending short portions 434 extend below the level of the outer loop 432.

Optionally, each of the downwardly-extending short portions 434 may be oriented at a slight angle relative to a straight vertical line, in order to help retain the bag in place on the bag-supporting portion 430. Another way of describing this geometry is that a downwardly-extending short portion 434 and the segment of the outer loop 432 to which it is attached cooperate to define an acute angle. A bag-retaining projection or "knuckle" 435 is defined at the slightly rounded corner formed between the outer loop 432 and the adjacent corresponding downwardly-extending short portion 434, at each end of the outer loop.

The bag-supporting portion 430 is designed and configured to slightly stretch the mouth of the bag 200 and to provide a certain amount of designed-in interference with a bag when the bag is placed thereon, in order to cause tension so as to securely hold the bag thereon, even if the bag is full of trash or other material.

The apparatus 20 also includes a connecting portion 433 interconnecting the bag-supporting portion 430 and the gripping portion 422. The connecting portion 433 includes a short horizontal link 436 (FIG. 27) at each end of the bag-supporting portion 430, which extends substantially horizontally from a lower end of a corresponding adjacent downwardly-extending short portion 434, and optionally but not necessarily, may also include a vertical segment 437 extending upwardly from a proximal end of the short link 436, again at each end of the bag-supporting portion 430.

The connecting portion also includes the connecting rod 438 extending inwardly from the upper ends of each vertical segment 437, and a short, horizontally extending load-bearing shaft 440 extending between a central portion of the connecting rod and the gripping portion 422.

Method of Use

The present invention also encompasses a method of using the bag-supporting frame apparatus of FIGS. 20-27. This method is illustrated by the flow chart of FIG. 32, and steps of the method are shown in FIGS. 28-31, where the apparatus 420 is installed on the trunk 411 of a narrow tree.

An illustrative method of using the apparatus 420 of the fourth embodiment includes a first step of holding the apparatus 420 sideways with the bag-supporting portion 430 in a substantially vertical plane, with the free end 427 facing downwardly. This step is shown at 450 in FIG. 32.

Figure 28:
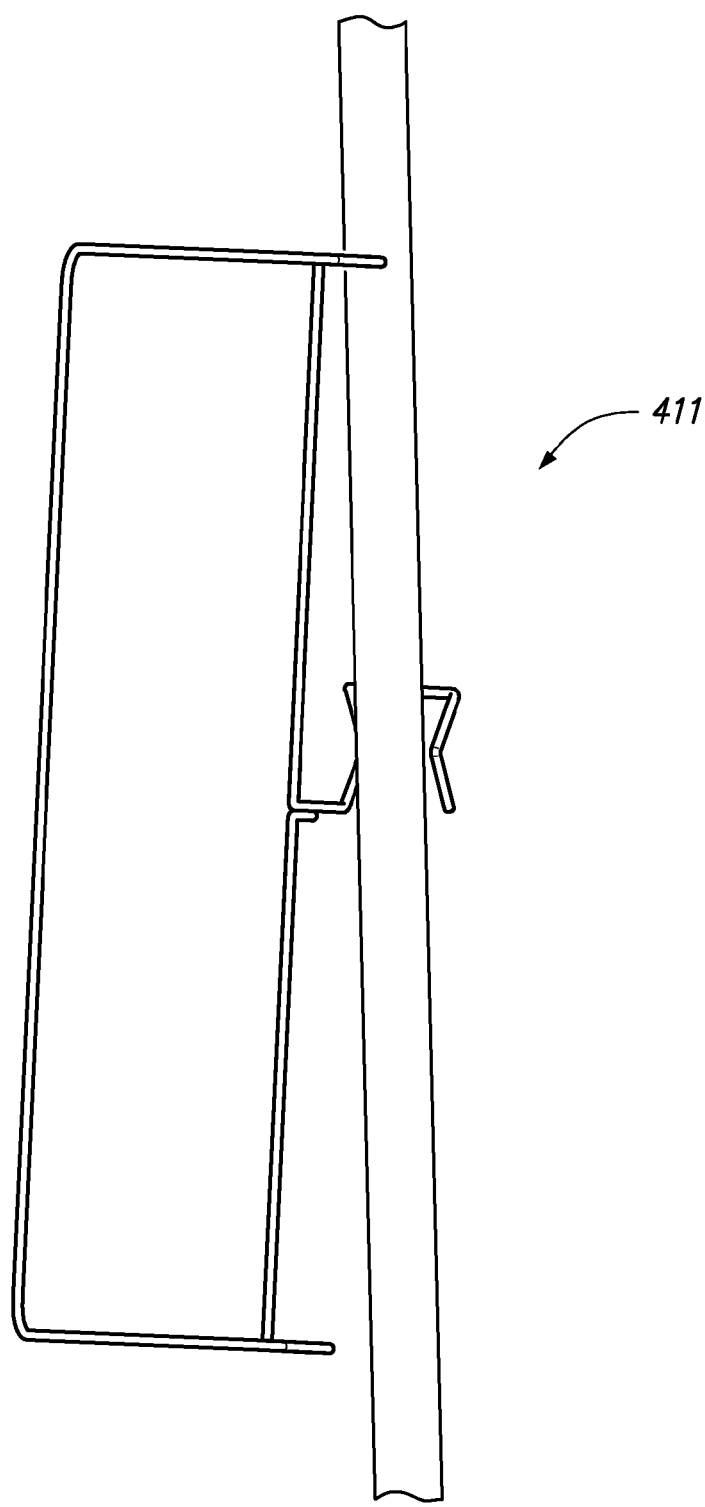
FIGS. 28-31 illustrate a series of steps in a method of installing the bag-supporting apparatus of FIGS. 24-25 on a vertically-oriented support post of a substrate.

Then, the apparatus 420 is moved so that a central part of the load-bearing shaft 440 comes into contact with a side surface of the support rod 411. This step is depicted in FIG. 28, and is shown at 452 in FIG. 32.

Figure 29:
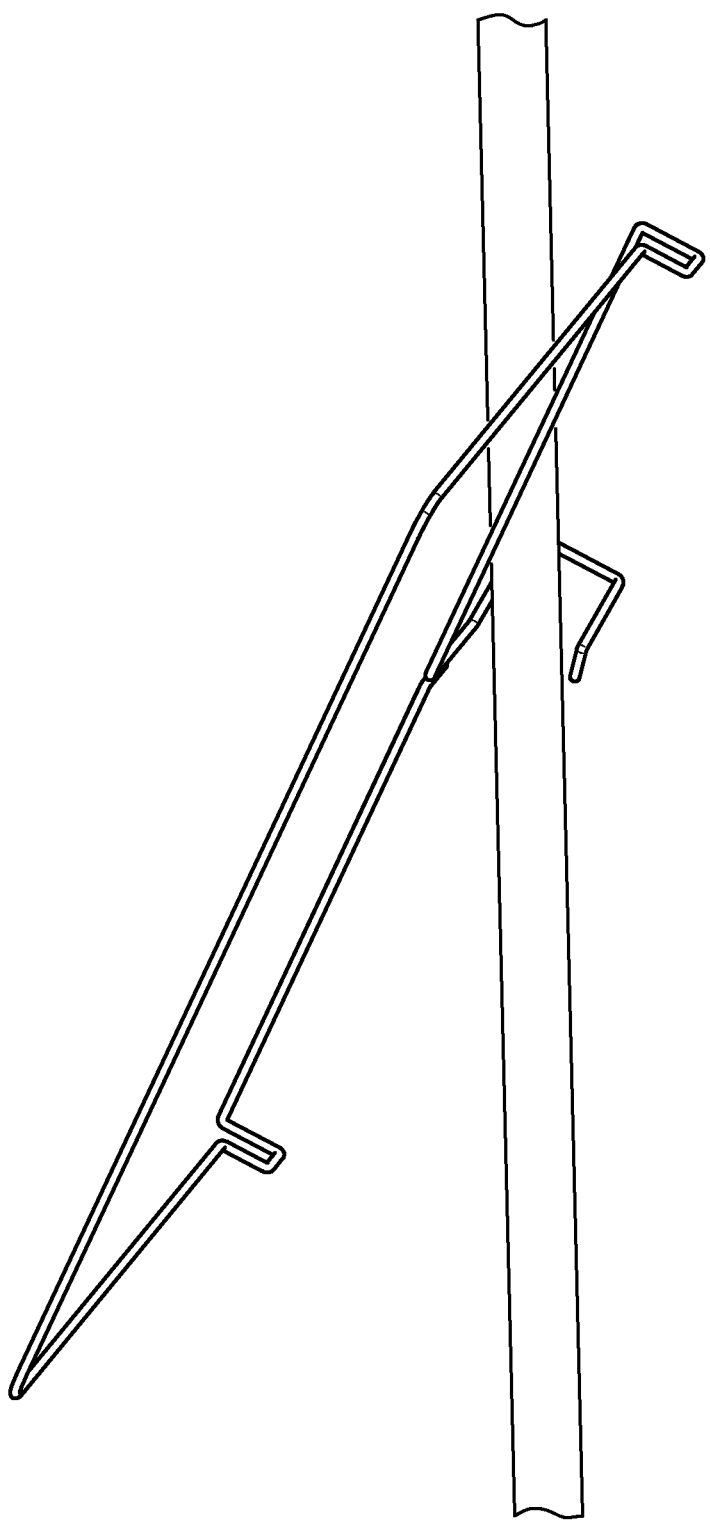

The next step in the illustrative method involves pivoting the apparatus 420 around the load-bearing shaft 440 to move the free end 427 toward the support rod 411. This step is depicted in FIG. 29, and is shown at 454 in FIG. 32.

Figure 30:
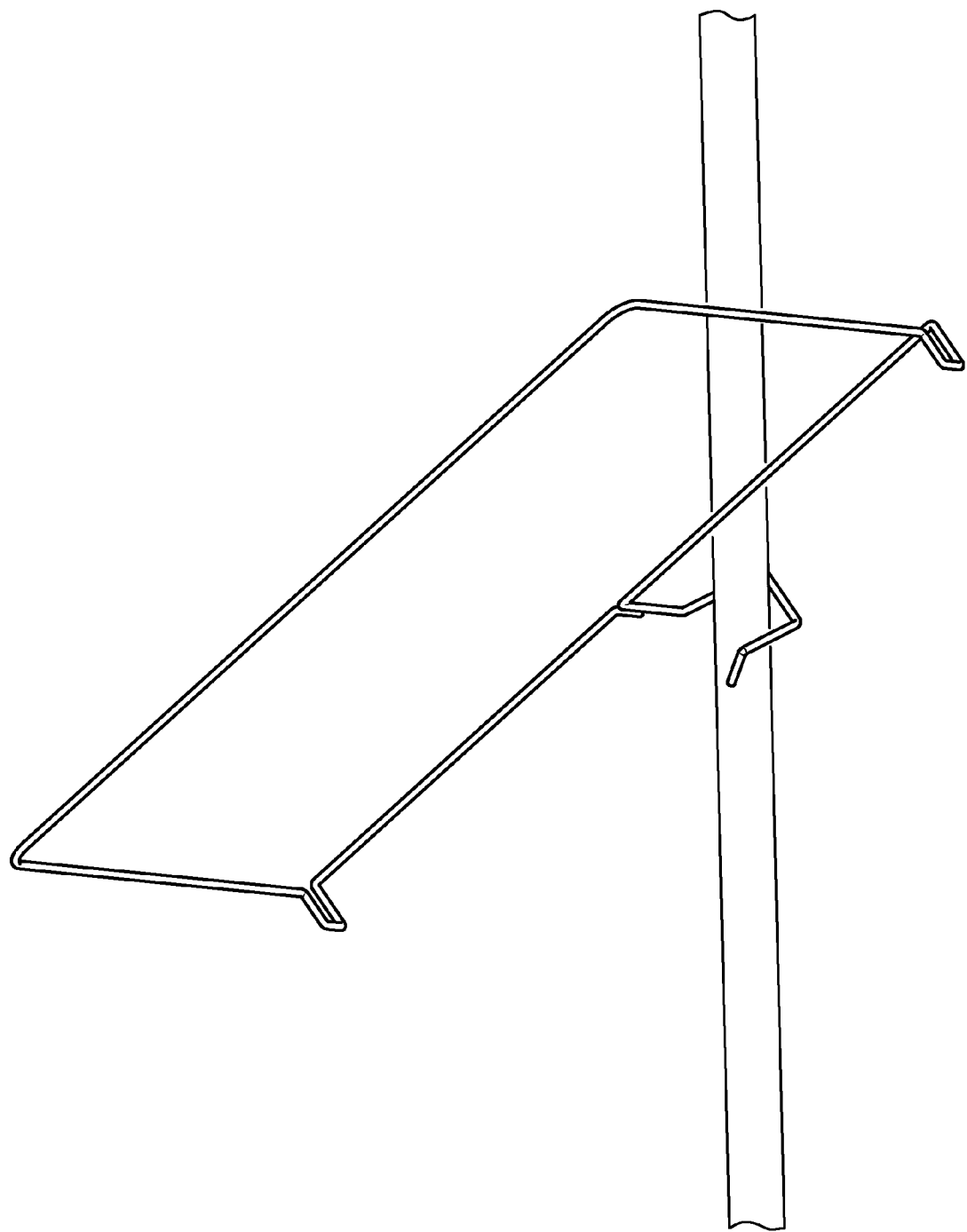

Another step in the illustrative method is to tip the bag-supporting portion 430 upwardly, and continue pivoting the apparatus 420 around the load-bearing shaft 440 to move the free end 427 past a near surface of the support rod 411. This step is depicted in FIG. 30, and is shown at 456 in FIG. 32.

Figure 31:
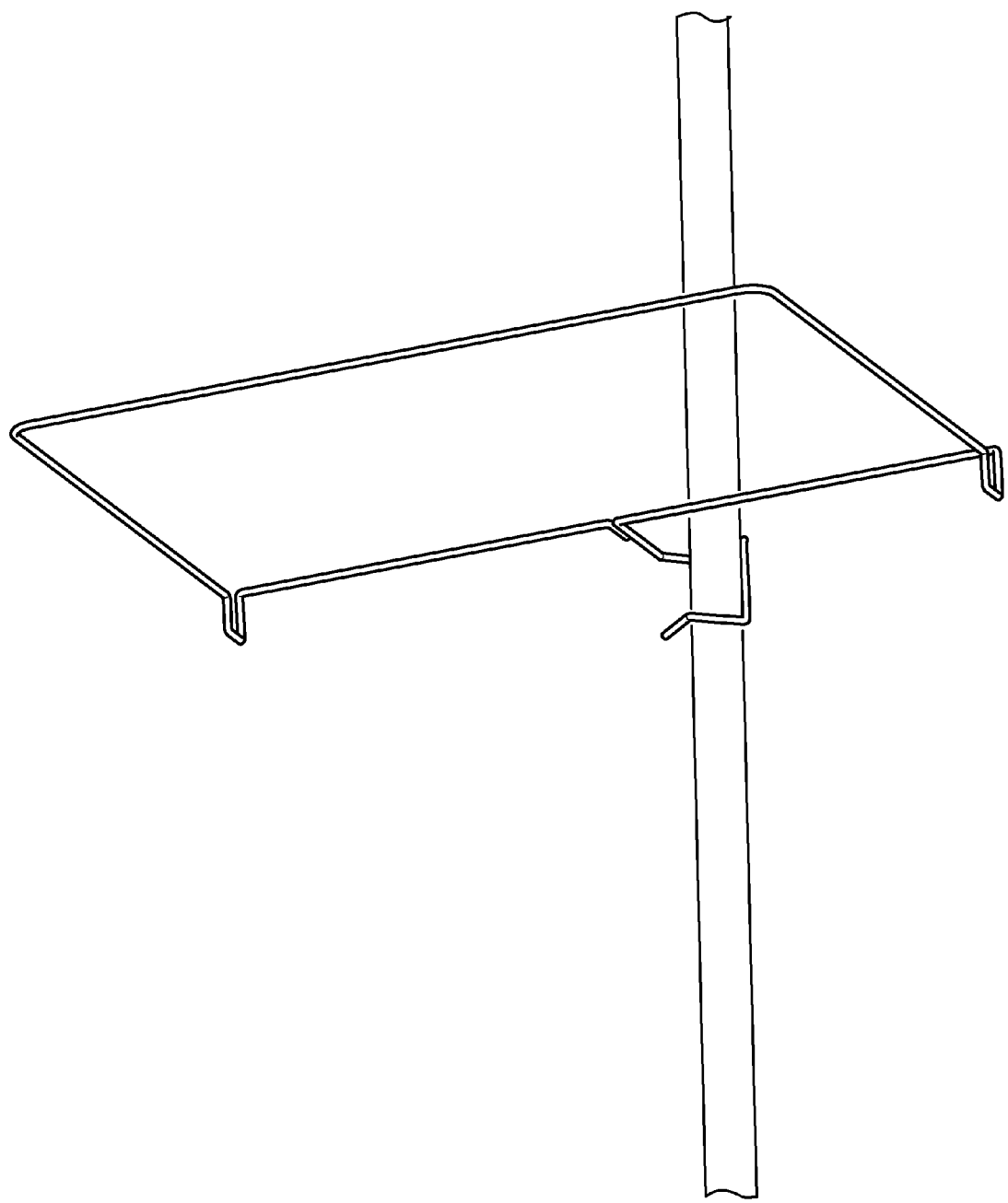
Figure 32:
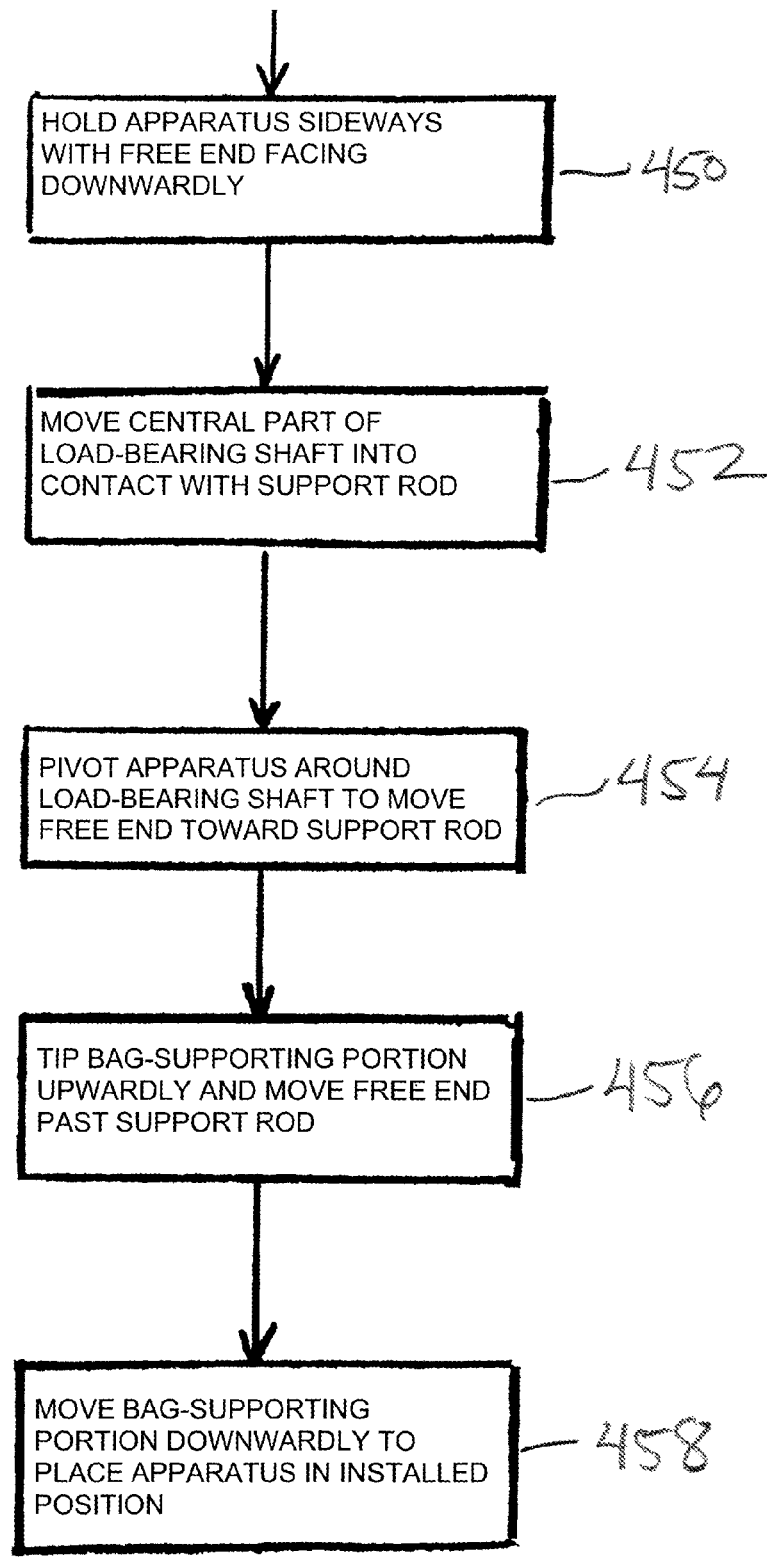
FIG. 32 is a simplified schematic flow chart illustrating steps in a method of installing the bag-supporting frame apparatus of FIGS. 20-27 on a vertically-oriented support post of a substrate.

Then, the bag-supporting portion 430 is moved downwardly, to place the apparatus into an installed position thereof. This step is depicted in FIG. 31, and is shown at 458 in FIG. 32.

Figure 8:
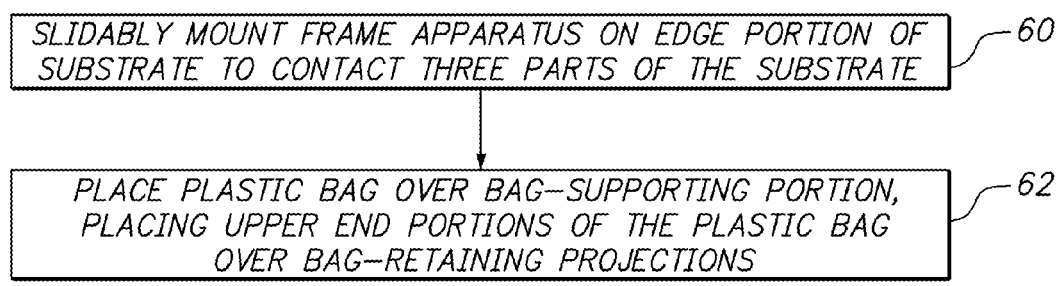
FIG. 8 is a simplified flow chart showing steps in a method according to the invention.

The method also includes a step of placing an open upper end of a plastic bag 200 over the outer loop 432 of the bag-supporting portion 430, and stretching portions of the upper end of the plastic bag 200 over the bag-retaining projections 435 of the bag-supporting portion 430. This step is similar to step 62 shown in FIG. 8, which could be appended to FIG. 32 as a last step in the sequence.

Then, trash or other material may be placed into the bag 200.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. A method of temporarily installing a flexible plastic bag on an edge of a substantially vertically oriented support rod of a substrate, the method comprising the steps of:
   a) holding a bag-supporting apparatus sideways with a bag-supporting portion thereof disposed in a substantially vertical plane, and with a free end thereof facing downwardly;
   b) moving the apparatus so that a central part of a load-bearing shaft comes into contact with a side surface of a support rod on which the apparatus is to be mounted;
   c) pivoting the apparatus around the load-bearing shaft to move the free end toward the support rod;
   d) tipping the bag-supporting portion upwardly further pivoting the apparatus around the load-bearing shaft to move the free end past a near surface of the support rod;
   e) moving the bag-supporting portion downwardly to place the apparatus into an installed position thereof on the support rod; and
   f) placing an open upper end of a plastic bag over an outer loop of the bag-supporting portion, and stretching portions of the upper end of the plastic bag over a pair of spaced-apart bag retaining projections of the bag-supporting portion.

* * * * *